United States Patent [19]
Dent

[11] Patent Number: 5,944,774
[45] Date of Patent: Aug. 31, 1999

[54] METHODS APPARATUS AND COMPUTER PROGRAM PRODUCTS FOR ACCUMULATING LOGARITHMIC VALUES

[75] Inventor: Paul Wilkinson Dent, Pittsboro, N.C.

[73] Assignee: Ericsson Inc., Research Triangle Park, N.C.

[21] Appl. No.: 08/938,410

[22] Filed: Sep. 26, 1997

[51] Int. Cl.$^6$ .................................................. G06F 7/50
[52] U.S. Cl. .......................................... 708/517; 708/671
[58] Field of Search ................................ 364/748.5, 768; 708/517, 671

[56] References Cited

U.S. PATENT DOCUMENTS

| | | | |
|---|---|---|---|
| 3,866,024 | 2/1975 | Williams | 377/44 |
| 4,682,302 | 7/1987 | Williams | 364/768 |
| 4,727,508 | 2/1988 | Williams | 364/748.5 |
| 4,737,925 | 4/1988 | Williams | 364/768 |

FOREIGN PATENT DOCUMENTS

| | | |
|---|---|---|
| 0 296 071 | 12/1988 | European Pat. Off. . |
| 0 591 846 | 4/1994 | European Pat. Off. . |
| 2 217 883 | 11/1989 | United Kingdom . |

OTHER PUBLICATIONS

Methods to Approximate the Logarithm of a Sum, *IBM Technical Disclosure Bulletin*, vol. 32, No. 5A, Oct. 1989, pp. 398–399.

*Primary Examiner*—David H. Malzahn
*Attorney, Agent, or Firm*—Myers Bigel Sibley & Sajovec

[57] ABSTRACT

The sum of a plurality of logarithmic numbers is determined by expressing the logarithmic numbers as one of a predetermined values. For example, the numbers may be analog values which may be sampled by an 8-bit AtoD converter to be expressed as one of a possible 256 values. The number of occurrences for each of the values is accumulated in bins (counters) and the sum is determined by a summation of the logarithmic numbers based on processing of the counts rather than the logarithmic numbers themselves. Bin counts are reduced iteratively by replacing counts greater than 1 by incrementing the count of a proportionately higher value bin until only counts of 1 or zero remain. These counts are then combined to provide only a single counter with a non-zero count value which indicates the accumulated signal strength of the signal strength measurements. The invention may further be provided using single bit memory elements and byte processing with look-up tables. In a further aspect of the present invention enhanced precision signed logarithmic magnitude expressions of numbers are combined utilizing Zech logarithmic values applied iteratively to a most significant and least significant component of the difference in the logmagnitude of the numbers to be combined.

30 Claims, 14 Drawing Sheets

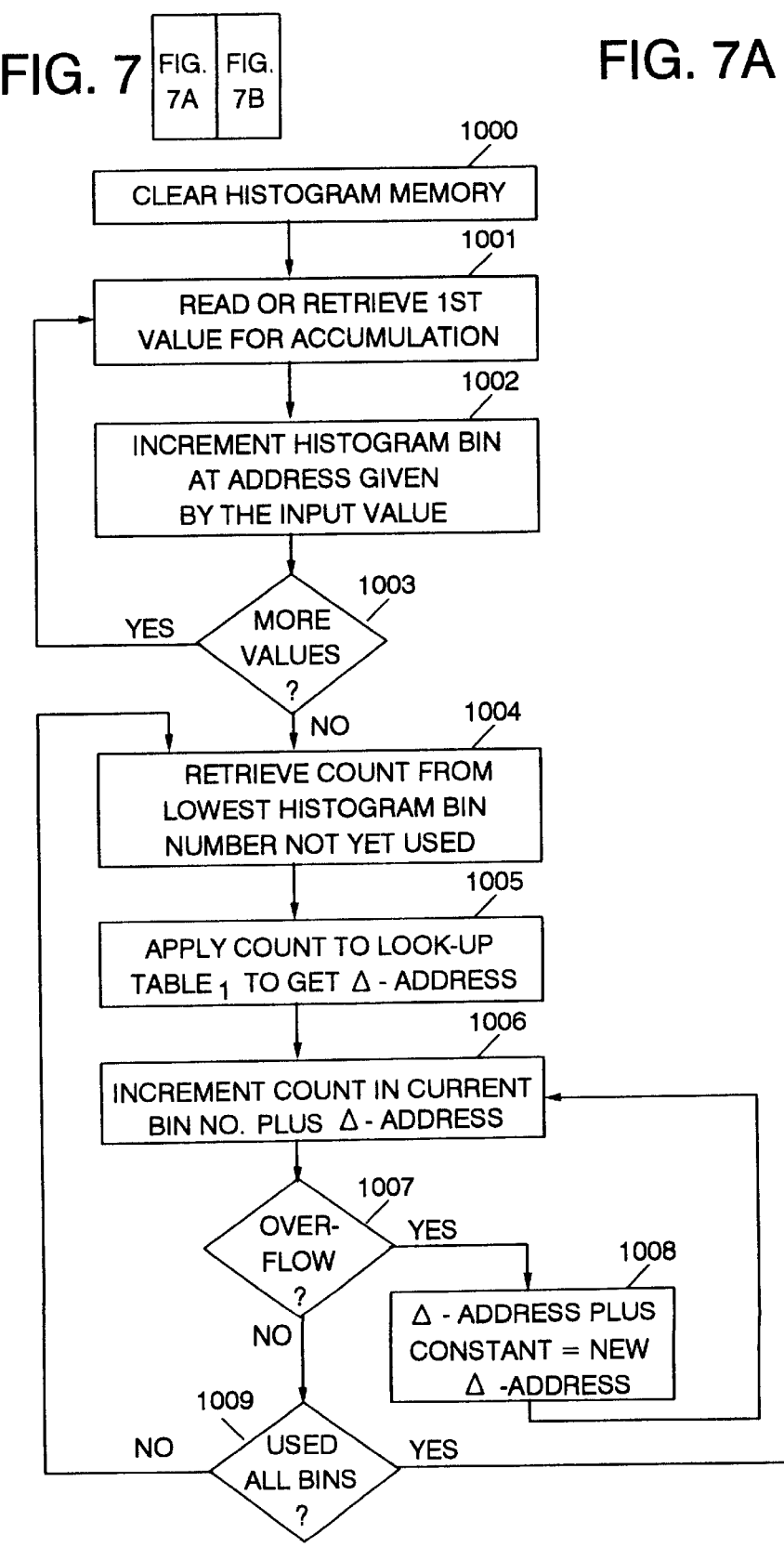

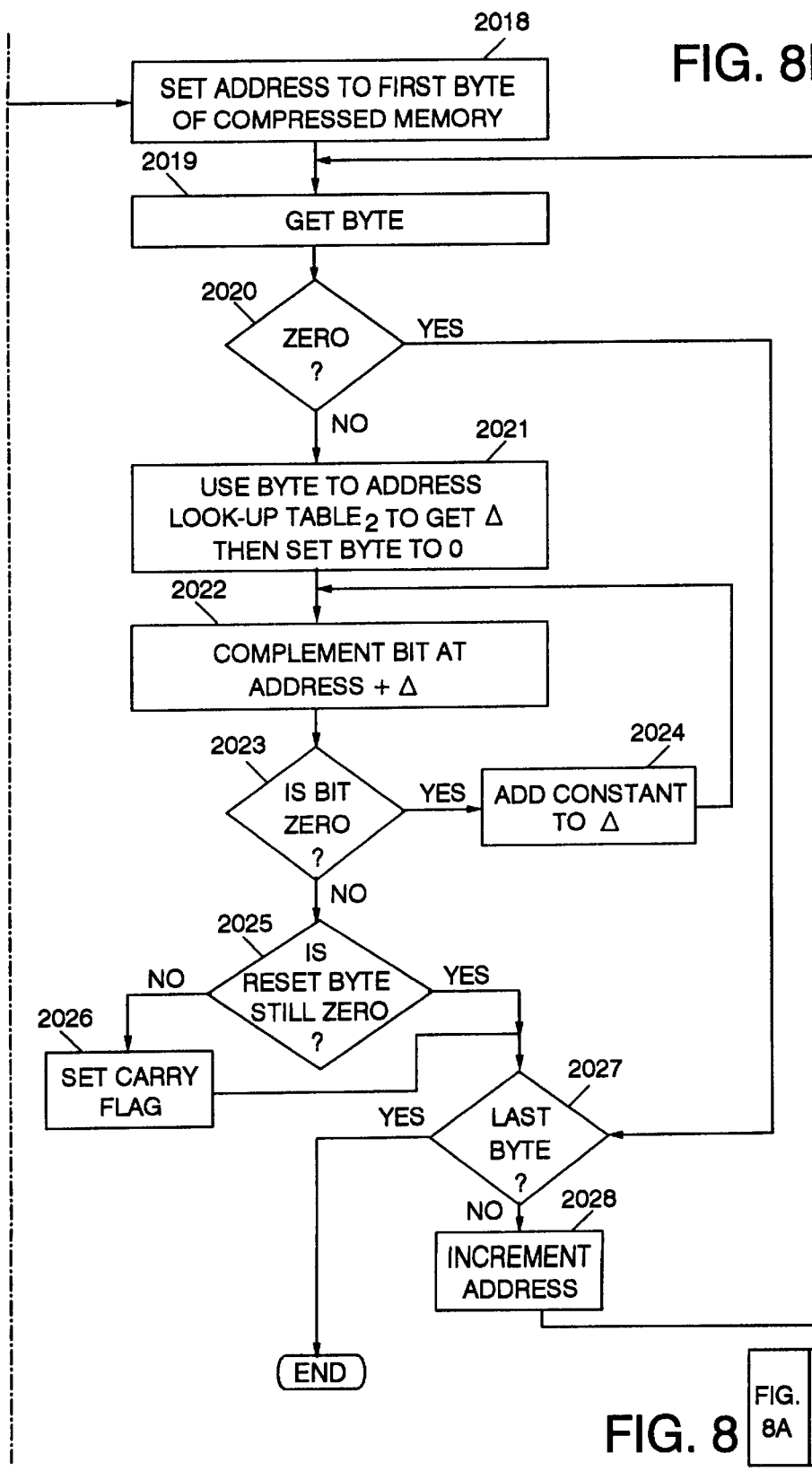

METHODS APPARATUS AND COMPUTER PROGRAM PRODUCTS FOR ACCUMULATING LOGARITHMIC VALUES

FIELD OF THE INVENTION

The present invention relates to apparatus and methods for performing calculations on numbers expressed as logarithmic values and more particularly to apparatus and methods for performing calculations on numbers expressed as signed logarithmic values.

BACKGROUND OF THE INVENTION

Numerical processors such as computers or digital signal processors generally use either fixed point or linear representation of quantities or floating point representation. In floating point representation, a quantity may be represented by three parts: Sign, Exponent and Mantissa.

The Sign bit indicates if the quantity represented is positive or negative. The Mantissa may represent the magnitude of the quantity, stripped of its Sign and scaled to be less than unity but greater than 0.5 by dividing or multiplying by some power of two. The Exponent indicates the power of two used to scale the Mantissa, where a positive exponent means the quantity is equal to the Mantissa multiplied by that power of two while a negative Exponent means that the quantity is equal to the Mantissa divided by a power of two. The Exponent can thus be positive or negative and thus has a sign bit of its own. The Exponent is, in fact, the integral part of the logarithm to the base two of the magnitude of the represented quantity. The fractional part, however, continues to be represented by the Mantissa on a linear scale. Floating Point is thus a mixed linear/logarithm representation in which the most significant bits are on a logarithmic scale and the least significant bits are on a linear scale.

It is also known to provide numerical representation in full logarithmic form. A full logarithmic representation is one in which both the integral part and the fractional part of the logarithm of the magnitude of the quantity are used, together with a Sign bit to indicate whether the quantity was positive or negative before taking the logarithm of its magnitude. The logarithm of the magnitude, like the Exponent of floating point representation, has a sign of its own indicating whether the magnitude was greater or less than unity. Alternatively, the logarithm can be regarded always as a positive number that describes how much bigger the quantity is than some least representable value. In either case, logarithmic representation has a problem in that zero typically cannot be represented as the logarithm of zero is minus infinity.

The advantage of a linear or fixed point representation is that adders are typically simple to construct, although multipliers are generally more complicated and power consuming. The advantage of full logarithmic representation is that multipliers and dividers are typically more simple to construct, being simply adders and subtractors, respectively, while addition is generally harder to perform.

Logarithmic representation, furthermore, is generally advantageous when squaring a quantity (a left shift) or taking the square root of a quantity (a right shift), and thus when operations such as $$\mathrm{SQRT}(X^2+Y^2)$$

have to be performed often, logarithmic arithmetic is typically more efficient, as there is only one difficult operation (the "+") to be performed instead of three (two squares and a square root) when using fixed point arithmetic.

With floating point representation, both addition and multiplication are generally more complicated operations, as are division and square root operations. Accordingly, floating point operations typically impose a high processing load.

SUMMARY OF THE INVENTION

In view of the above discussion, it is an object of the present invention to provide full logarithmic representation of values for use in calculations.

It is a further object of the present invention to provide an improved apparatus and methods for logarithmic addition and subtraction.

It is an additional object of the present invention to provide an improved apparatus and methods for accumulating signed logarithmic values.

It is a further object of the present invention to provide for apparatus and methods which use full logarithmic representation while providing for a representation of a value of zero.

The present invention provides apparatus and methods for the addition of numerical values expressed as logarithmic values. A method is provided for summing a large number of unsigned logarithmic values without the processing load normally associated with logarithmic addition by first expressing the logarithmic values as one of a discrete number of values. For example, the logarithmic value may be represented by an 8-bit binary word thereby providing a total of 256 discrete possible values representing the range from the largest to the smallest value. Counters accumulate a count of the number of occurrences of each of the discrete values in a larger (i.e. significantly more than 256 values) population of logarithmic values to be summed. The sum of the values is then generated by iterative reduction of the counts in the counters rather than by summation of the logarithmic values themselves. The iterative procedure involves first replacing counts of greater than one in a lower value counter by incrementing the count in a higher value counter which is proportionate to the count greater than one being replaced. Once all of the counters have been reduced to a value of one or zero, the non-zero counts are combined, starting with lower discrete value counters, until only one counter has a non-zero value which represents the sum of all the logarithmic values to be summed.

The present invention further provides for accumulation of signed logarithmic values. Processing load is reduced by a novel application of Zech logarithms as will be described more fully below. The methods of the present invention provide for improved efficiency where limited precision is required for addition or subtraction of logarithmic values.

In a first aspect of the present invention, a method is provided for summing a plurality of logarithmic numbers. Each of the plurality of logarithmic numbers is expressed as one of a predetermined number of values, for example the 256 possible values of an 8-bit AtoD converter output. The number of occurrences of each of the plurality of logarithmic numbers is accumulated in a plurality of counters, each one of the plurality of counters being associated with one of the predetermined number of values. The value count of a first one of the plurality of counters having a value count greater than one is reduced by decreasing the value count of the first one of the plurality of counters and incrementing a second one of the plurality of counters. The second one of the plurality of counters is selected as the counter having an associated one of the predetermined number of values corresponding to a multiple of the associated one of the predetermined number of values of the first one of the plurality of counters. If the second one of the plurality of counters a third one of the plurality of counters is incremented to carry forward the overflow. Operations are repeated until the plurality of counters have a value count of one or less.

In a further embodiment of the present invention the "histogram" of value counts of one or less is further processed to provide only a single non-zero value replacing a non-zero count in two of the plurality of counters by incrementing another of the plurality of counters. This operation is repeated iteratively until only one of the plurality of counters contains a non-zero count corresponding to a sum of the plurality of logarithmic numbers. In another embodiment of the methods for summing a plurality of quantities of the present invention, the summation is provided utilizing a plurality of single bit memory elements. The plurality of single bit memory elements, each of which correspond to one of the discrete number of values, are initialized to zero. A first one of the plurality of quantities is then obtained. A first one of the single bit memory elements corresponding to the quantitized value of the obtained one of the plurality of quantities is then incremented using modulo-2 arithmetic. A second one of the single bit memory elements corresponding to twice the quantitized value of the first one of the single bit memory elements is incremented using modulo-2 arithmetic if a carry is generated when the first one of the single bit memory elements is. In one embodiment, following incrementing of the second one of the single bit memory elements any carry from incrementing the second one of the single bit memory elements is propagated by iteratively incrementing a single bit memory element corresponding to twice the quantitized value of a single bit memory element generating a carry. The operations are repeated for each of the plurality of quantities to be summed to provide a non-zero one of the single bit memory elements corresponding to one of the discrete number of values indicating the sum of the plurality of quantities. Preferably single bit memory elements having corresponding values related by a factor of two are chained together to form a binary word.

In a further aspect of the methods of the present invention, a method is provided for combining a first number and a second number, the first and second number each having a sign and logmagnitude. The sign of the first number is compared to the sign of the second number to determine if an add or subtract operation is required to combine the first number and the second number. The difference between the logmagnitude of the second number and the logmagnitude of the first number is determined. The larger magnitude one of the first number or the second number is identified based on the determined difference an placed in an output register as an output value. If a desired precision threshold has been reached operations are stopped. Otherwise the following steps are repeated until the desired threshold has been reached. A most significant portion and a least significant portion of the determined difference is identified. A first value associated with the most significant portion is obtained from a first table. The value obtained from the first table is, preferably, a Zech logarithm value. The obtained first value is accumulated with the output value. The obtained first value is also accumulated with the determined difference to provide a new determined difference.

In a further embodiment of the methods of the present invention for combining two numbers having a sign and a logarithmic magnitude, the repeated operations further include obtaining a second value associated with the least significant portion from a second table. The second value is, preferably, also a precomputed Zech logarithm value. The obtained second value is also accumulated with the determined difference to provide a new determined difference.

As will further be appreciated by those of skill in the art, while the invention has been described above with reference to the method aspects of the invention, the present invention may be embodied as a method, apparatus or computer program product.

BRIEF DESCRIPTION OF THE DRAWINGS

FIG. 7 is a schematic illustrating the relationship between FIG. 7A and FIG. 7B.

FIG. 7A is a flowchart illustrating operations according to an embodiment of the present invention.

FIG. 8 is a schematic illustrating the relationship between FIG. 8A and FIG. 8B.

FIG. 8B is a flowchart illustrating operations according to another embodiment of the present invention.

FIG. 9 is a schematic illustrating the relationship between FIG. 9A and FIG. 9B.

DETAILED DESCRIPTION OF THE INVENTION

The present invention now will be described more fully hereinafter with reference to accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
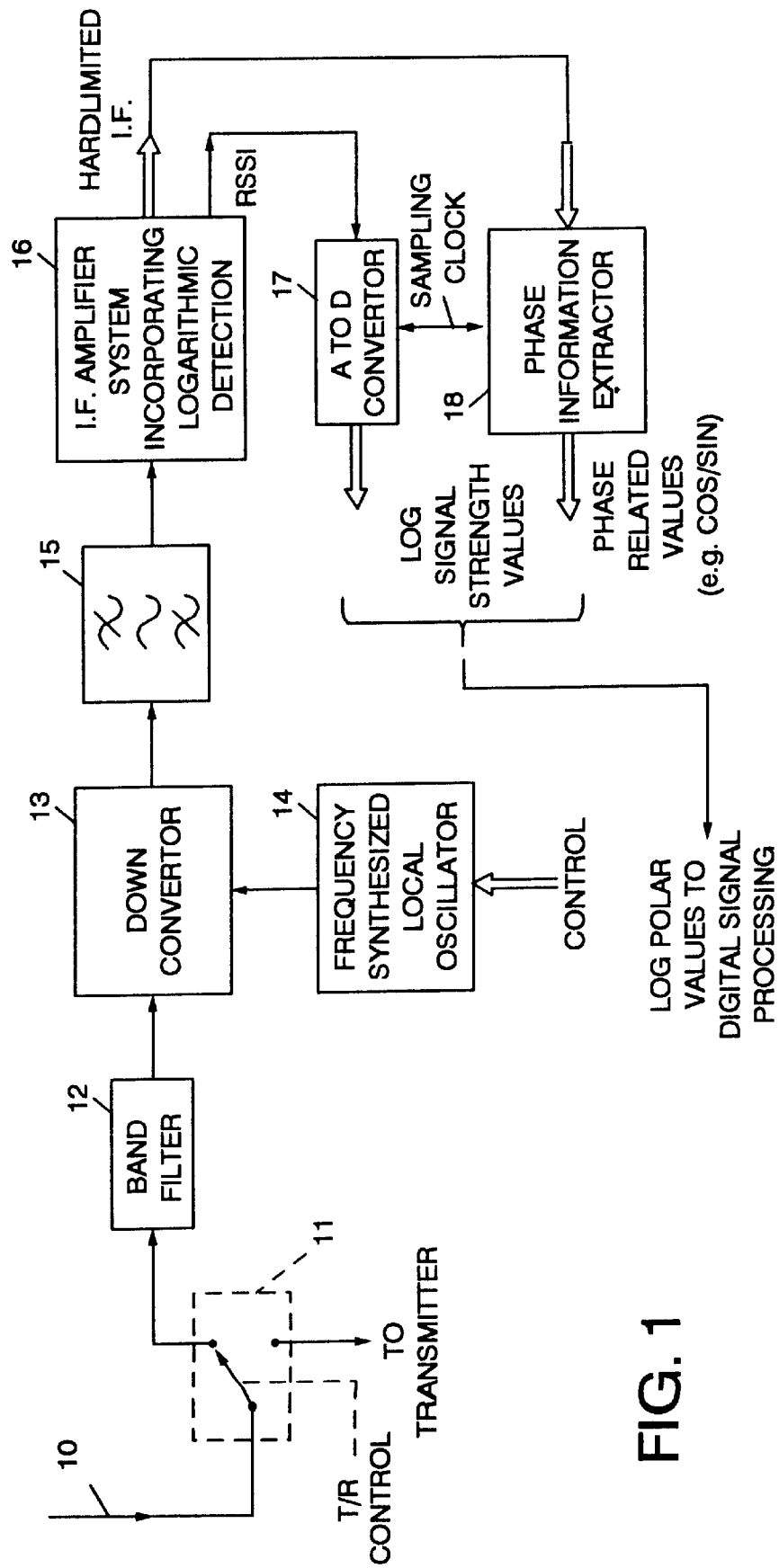
FIG. 1 is a block diagram illustrating a signal receiver apparatus for use with the present invention.

Referring now to FIG. 1, the operating environment for the present invention will be described for accumulating logarithmic values from samples of a signal received by an antenna which represents one operating environment in which the present invention may be utilized. FIG. 1 illustrates a typical receiver block diagram for receiving a signal from an antenna. An antenna 10 is connected by Transmit/Receive switch 11 alternatively to a receiver or a transmitter depending on whether a transceiver is transmitting (transmitter) or receiving (receiver) a signal. The receiver in the illustrated embodiment includes band-limiting filter 12, downconvertor 13, local oscillator 14, first IF filter 15 and IF amplifier system 16. As illustrated in FIG. 1, IF amplifier system 16 is assumed to incorporate a detector or other means for taking a plurality of measurements of the signal on an approximately logarithmic scale. The measurement is subsequently sampled and digitized by AtoD convertor 17. The measurements are selected from a predetermined number of values by AtoD convertor 17. The IF amplifier system 16 may further output a hardlimited first or second IF signal containing instantaneous signal phase information to phase digitizer 18, which outputs digitized values related to phase such as the cosine and sine of the phase or the phase value itself. The digitized measurement values may contain two components, one approximately proportional to the logarithm of the instantaneous signal amplitude and the other phase related values measured at the same sampling clock. The combination of these aspects of the digitized signal strength measurement values form a series of logpolar values which represent the full, complex-vector nature of the received signal when practicing the logpolar technique of above-incorporated U.S. Pat. No. 5,048,059. The logpolar values may then be processed in a digital signal processor (not shown) to extract information. A cellular phone sampling a received communication signal to generate a received signal strength indication (RSSI) is an example of a use to which the system of FIG. 1 could be applied.

The current invention is particularly directed to processing logarithmic values which are represented in a digital rather than an analog form. It will be appreciated that digital averaging may, for example, be better suited to computing averages over disjointed periods of time. However, it can be more burdensome, particularly in terms of power consumption, to accumulate, integrate or sum a larger number of values digitally as compared to using an analog method. The invention seeks to reduce the effort involved in adding or accumulating a large number of digital logarithmic values.

According to a first aspect of the invention, when the number of values to be summed is much greater than the number of possible different values (i.e., output bit patterns) that the AtoD convertor can produce, it is only necessary to count how many times each of the possible values is observed over the summation window. If the AtoD convertor is an 8-bit convertor, for example, only 256 possible different values can be produced at its output. These values might typically correspond to measurements on a logarithmic decibel scale having a range of 128 dB in 0.5 dB steps. The least significant bit of a bit pattern corresponds to a 0.5 dB step, the second least significant bit corresponds to a 1 dB step, and so on up to a most significant bit which corresponds to a 64 dB step. Because the AtoD convertor produces 256 different output values, only 256 counters are needed to remember how many times each output was produced, regardless of how many measurement samples are actually taken. The 256 counters may conveniently be represented by 256 random access memory locations within a microprocessor memory, each having an address. If the memory addresses are considered to start at a value equal to the lowest value that can be measured (e.g., below the lowest noise level) and increase sequentially, each address can be considered to be equal to a corresponding logarithmic numerical value. Where the quantities to be accumulated are not measured but instead, for example, are logarithmic numbers contained in memory, the lowest value counter may be selected based on the lowest value one of the logarithmic numbers to be accumulated. As used in describing the embodiments of the present invention herein, the "counters" will also be referred to as "memory locations" or "bins."

Each time the AtoD convertor samples the measurement, an address (memory location) corresponding to the AtoD convertor's output (the digitized measurement value) is incremented by one to record the occurrence of that particular measurement value. The counts are preferably reset to zero at the beginning of a period of measurement accumulation.

Figure 2:
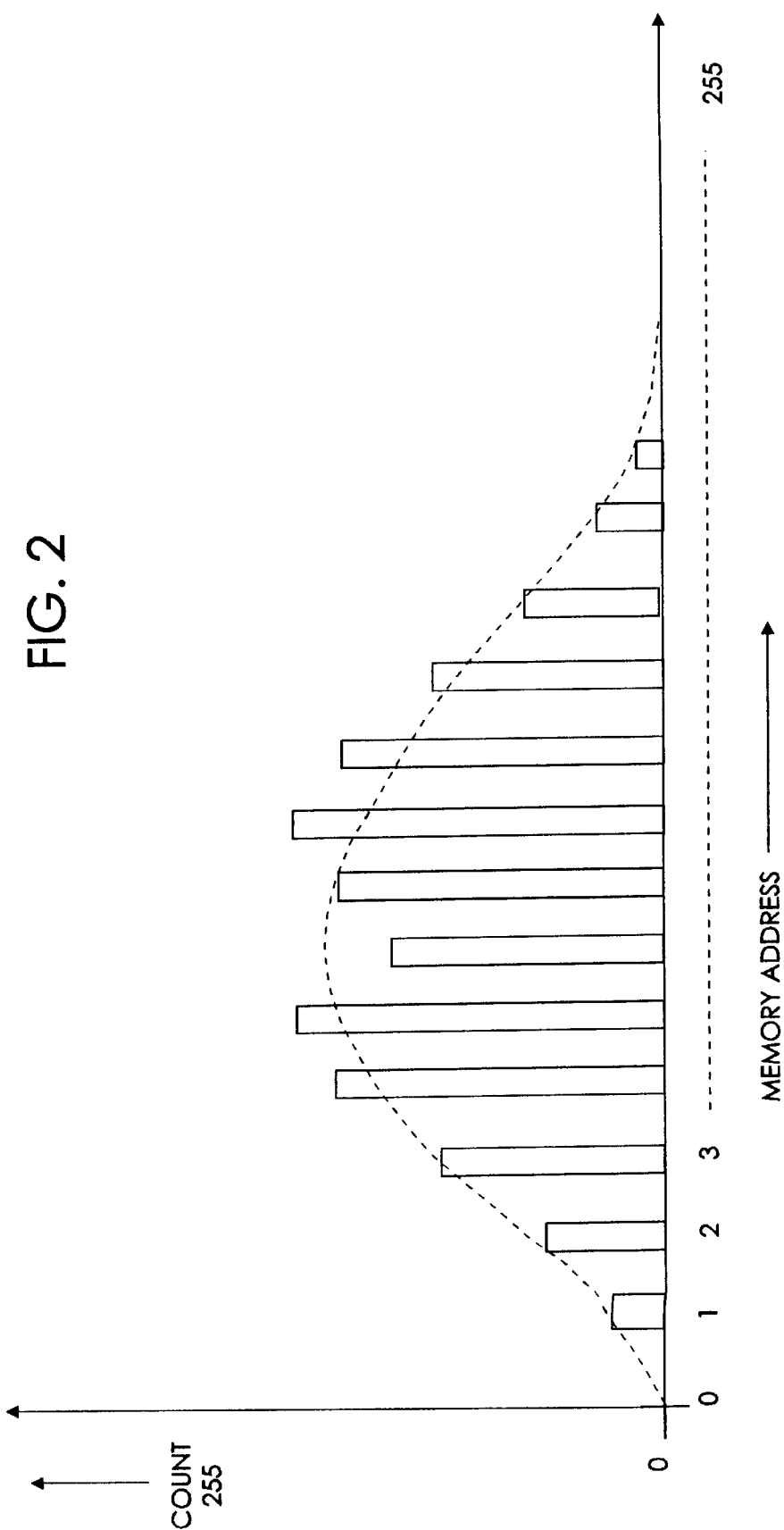
FIG. 2 is a graphical illustration of a plurality of signal strength measurements obtained according to an embodiment of the present invention.

At the end of the period of observation, the contents of the memory locations provide a histogram of the logarithmic numbers to be accumulated probability distribution as shown in FIG. 2. Typically, not all counters will be populated with a non-zero count. The distribution will generally be expected to be concentrated around a region of values narrower than the full receiver dynamic range in applications of the present invention based on measurements of naturally occurring signals such as cellular phone signals. If the number of measurements taken is not too great, such that the number of observations of any particular value is not expected to exceed 255, the count can be contained within one 8-bit byte. However, a further aspect of the invention compensates for overflow of a bin count. Because an overflow in the exemplary embodiment of one 8-bit byte bins indicates that the same number has been observed 256 times the total energy (sum of numbers) those observations represent is simply 256 times the energy of a single value which on a dB scale is $10 \text{ LOG}_{10}$ (256), or 24.08 dB more than the single value.

Assuming the addresses (memory locations) represent number values in decibels in 0.5 dB steps as in the described embodiment, instead of placing a count of 256 in one bin, a count of 1 is placed in the bin 24.08 dB higher, i.e., in bin (address plus 48). The overflowed bin automatically resets to zero as required. (i.e. when the bin count overflows from 11111111 to 00000000 when counting from the 255th to the 256th occurrence of a corresponding signal strength measurement from the AtoD converter in the 8-bit byte embodiment of the bins). This overflow process can be implemented by chaining together into one longer binary word, byte addresses that are 48 apart in memory corresponding to the 24.08 dB higher as discussed above. Therefore, overflow of single-byte count values upon incrementing a count of 255 to become once more equal to zero is accounted for by incrementing the next byte in the chain, i.e., the byte 48 higher in memory. It is to be understood that, if the logarithmic scale used is not 0.5 dB per step, the address increment of 48 should be changed to whatever value is closest to an increment of 24.08 dBs in energy. An alternative memory storage arrangement will be disclosed below that places these chained bytes next to each other in memory thus creating longer words to facilitate carry propagation using conventional binary adders.

After collecting the histogram of values in the above manner, as depicted in FIG. 2, the numbers (energies) represented by the counts are summed. In the same way as 256 counts (occurrences) of the same value were explained above to be equivalent to one value 24.08 dB higher so the observation of any plural count of any value is equivalent to the observation of a single count of a higher value, i.e., a count of one in a higher-addressed memory location. For example, a count of two in address A is the same as a count of 1 in address A+3 dBs (A+6 in the case of 0.5 dB steps). Similarly, three equal values at address A equate to one value at address A+4.77 dBs (A+10 approximately), four equal values at A equate to one value at A+6 dBs (A+12) and so on. Because there will never be a count greater than 255 in any bin (assuming one 8-bit byte bins), a 255-entry look-up table in Read Only Memory (ROM) suffices to translate each possible count from 2 to 256 into the nearest integral number of addresses away that another count may be incremented in order to represent the sum of the numbers in the lower value bin.

Figure 3:
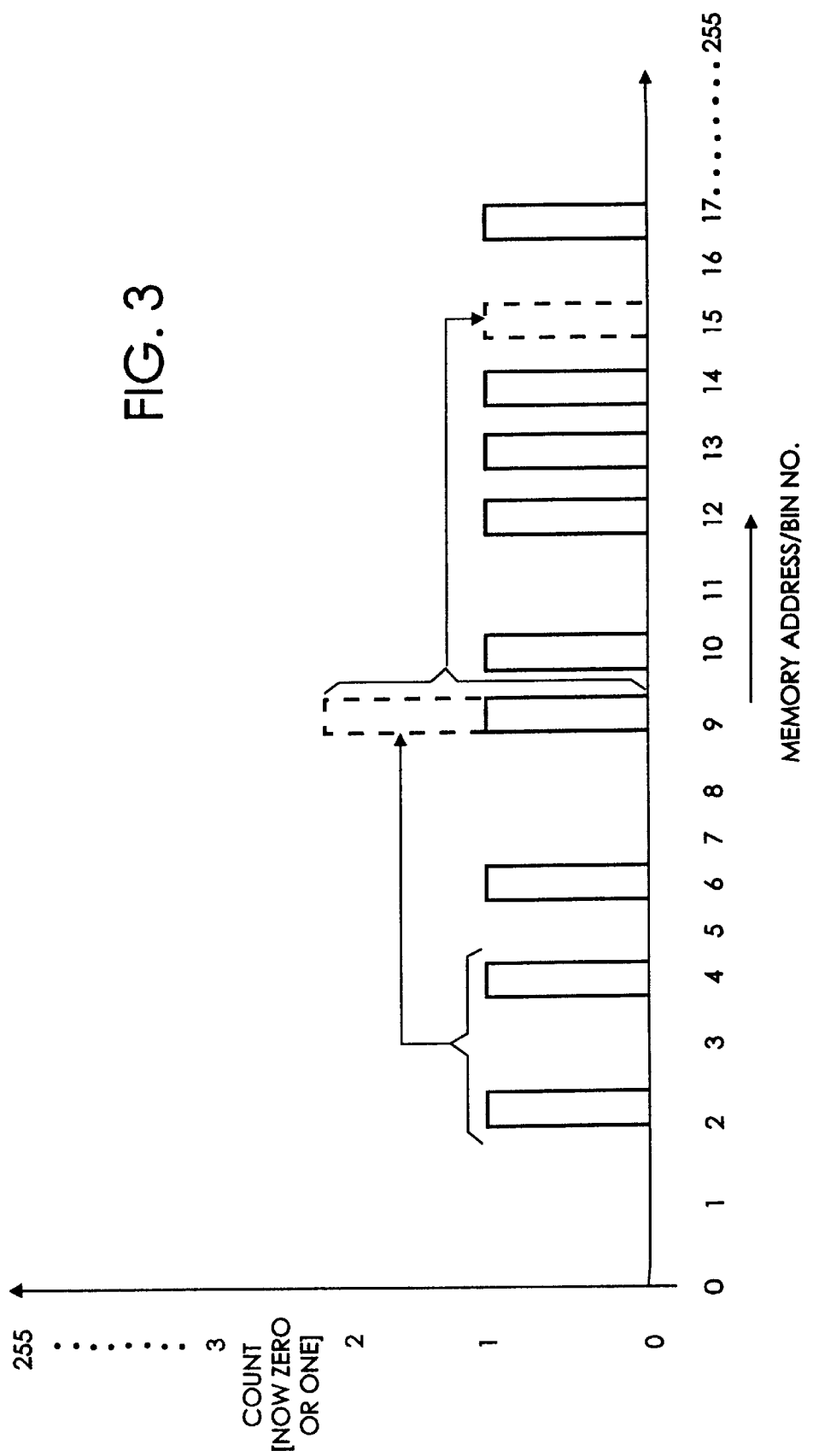
FIG. 3 is a graphical illustration of processing of the plurality of signal strength measurements as illustrated in FIG. 2.

The above procedure of replacing counts greater than 1 by increments to a count in a higher address in one embodiment of the present invention is applied iteratively starting with the lowest bin number until each bin finally contains only a count of one at most, as illustrated in FIG. 3. Further number summation according to the illustrated embodiment of the present invention then utilizes means to combine single (unity) counts from different bins.

When quantities are represented as finite precision numbers using a non-linear mapping, such as either floating-point representation or the fixed-point logarithmic scale discussed above, there is a preferred order to combine such quantities to produce a number representative of the sum while reducing the effects of rounding error. It is easier to understand the preferred method through an example of a non-preferred method. Fixed precision logarithmic representations have the characteristic that the least significant bit of precision does not always represent the same amount. For example, if a quantity is represented by its base 10 logarithm with one decimal digit before the decimal point and one afterwards then the quantity 10 million is represented as "7.0" and "7.1" represents about 12.5 million. Consequently, incrementing the least digit from 0 to 1 increases the quantity represented by 2.5 million. On the other hand, the quantity 5 is represented by "0.7", and "0.8" represents a value of about 6.25, so incrementing the least digit by one in this case represents an increase in the quantity of only 1.25.

If a logarithmic addition unit is asked to combine two quantities having a great disparity in value such as 10,000,000 and 5 (represented by their respective base 10 logarithms "7.0" and "0.7") to obtain the logarithm of their sum 10,000,005 in the same x.x representation, the answer will again be 7.0, as the logarithm of 10,000,005 is insufficiently different from the logarithm of 10,000,000 to be seen in the least significant digit of "7.0." Thus, the addition of 5 to 10,000,000 will not be seen however many times 5 is added. Even if 5 is added one million times, the result will still be the logarithm of 10,000,000 (i.e. "7.0") and not the logarithm of 15,000,000 as desired. Logarithmic quantities are, therefore, preferably not combined in the order "smallest plus largest." Instead, the two smallest quantities are preferably combined together first to produce a sum which is larger than each of the two quantities. The sum is preferably re-sorted in descending order of value with the remaining quantities to be summed and the two smallest quantities again combined and so forth until there are only two quantities left to combine, for example, the largest quantity and the sum of all the others. Thus, the sum of all the smaller quantities is a value closer to the largest quantity and has a better chance of affecting the least significant digit of the largest quantity when combined with it. For example, if 5 is to be added to 10,000,000 one million times, it is better to add the one million 5's together first to obtain the logarithm of 5,000,000 as "6.7." The sum 5,000,000 then can be combined with the 10,000,000 as the logarithmic addition of "6.7" and "7.0" to obtain the logarithm of the sum 15,000,000, as "7.2," which is the closest approximation for the fixed significant digits used to the more accurate value "7.176."

Consequently, proceeding from the situation reached in FIG. 3 comprises combining counts of lower value memory locations first to determine which higher-addressed memory location is equivalent to their sum. The two lowest non-zero entries in bins 2 and 4 are combined first. If the quantity in bin 4 is "X," the quantity in bin 2 is 1 dB lower, i.e., about "0.8X." Thus bin 4 combined with bin 2 is a quantity of "1.8X," which is $10LOG_{10}(1.8)$ which is 2.5 dB higher than "X," a combination which is equivalent to a count in a bin 5 bins higher than bin 4 (i.e., bin 9). Bin 9 is incremented by one to collect the sum of bin 2 and bin 4. In the illustrated example of FIG. 3, bin 9 contained a 1 already and would increment to 2. A 2 in bin 9 is equivalent to a 1 in a 3 dB higher bin (i.e., 6 bins higher at bin 15). Bin 9 is thus incremented modulo-2, and becomes zero instead of two with a carry being generated to bin 15. Because bin 15 was zero in the illustrated example, it increments to 1 without a carry and carry propagation stops. Otherwise, the carry propagation would be allowed to continue through bins 9, 15, 21, etc. until it stops. It will be recognized by one of ordinary skill in the art that the carry procedure is binary addition with carries chained between bins that are 6 apart, or whatever separation corresponds to 3 dB or a factor of 2 in energy for the particular logarithmic (or monotonic) scale chosen.

Still referring to FIG. 3, after combining the entries in bins 2 and 4, the next two entries to be combined are in bins 6 and 10, the entry in bin 9 having been cleared to zero by the above carry operation. Bins 6 and 10 are 4 bins or 2 dB apart, so their relative values are "0.6X" for bin 6 and "X" for bin 10. Combining bins 6 and 10 results in a sum of "1.6X" which is 2 dB higher than "X," a combination which is equivalent to a count in the bin 2 dB (four places) higher than bin 10, i.e., bin 14. Consequently the entry in bin 14 is incremented to receive the combined energies of bins 6 and 10, causing a carry to bin 20 and leaves bin 14 at zero in a manner like that described for the carry from bin 9 above. This process continues with the combination of bins 12 and 13 and so forth until all bins have been combined and the final combination results in a 1 being placed in a bin position, the address of which yields the logarithm of the sum of the original numbers.

Figure 4:
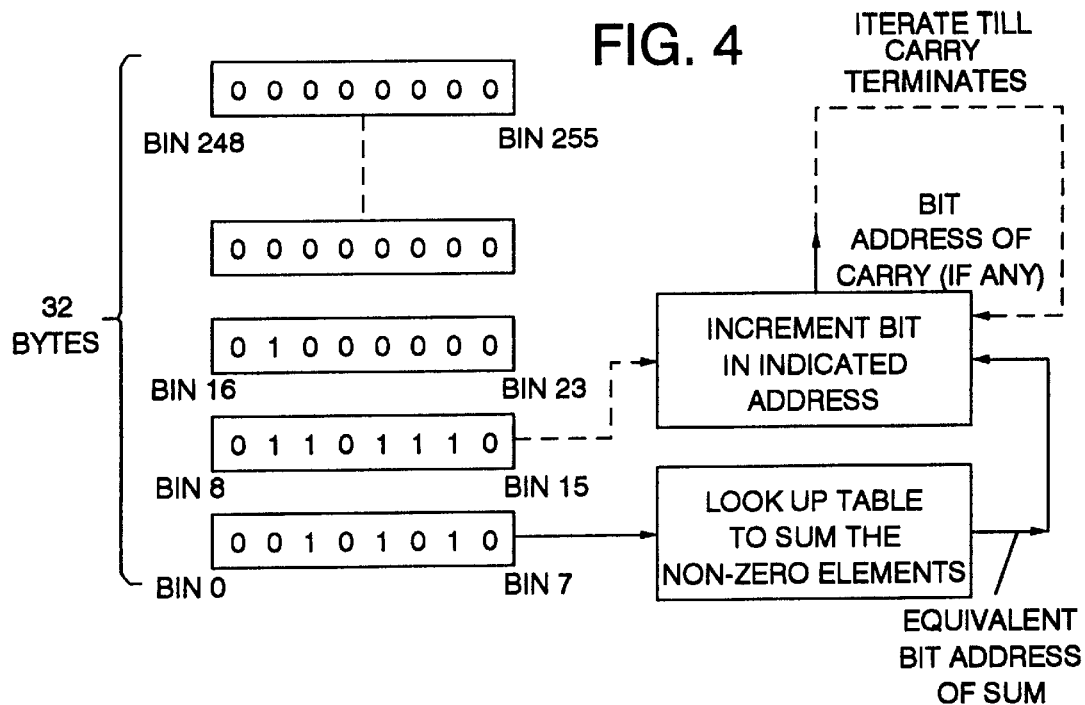
FIG. 4 schematically illustrates an embodiment of an apparatus according to the present invention.

In FIG. 3, after reduction from FIG. 2 of multiple occurrences of the same value to a single occurrence, the histogram memory contains only entries of 0 or 1, i.e., single-bit quantities. Therefore, the resulting information after reducing the counts as described with respect to FIG. 2 can be held in a smaller memory of 256 bits rather than 256 bytes. This compressed representation occupies only 32 bytes, as depicted in FIG. 4. Moreover, combination of the non-zero entries need not be limited to combination of pairs of bins. For example, eight bins at once, whose 0 or 1 entries occupy a single byte, may be combined simultaneously by using the byte to address a precomputed look-up table to obtain a number representative of the sum of all the non-zero entries contained in the byte. For example, if the byte contained the bit pattern 10010010 having a most significant bit (associated with the higher value bin) on the left, then denoting the quantity represented by the most significant bit by "X," the next bit to the right (3 bins lower at 0.5 dB per bin) represents a quantity 1.5 dB less than "X" or "0.7X" approximately, and the next bit 6 bins lower (3 dB) represents "0.5X." The whole byte thus represents a quantity of "X"+"0.7X"+"0.5X"="2.2X" which is 3.5 dB greater than "X." The whole byte can, therefore, be replaced by an entry in a bin 7 higher, which is accomplished by placing a 1 in the second most significant bit of the next byte. The look-up table entry for the above bit pattern would thus contain the value 15, the number of the most significant non-zero bit (i.e., bit number 8) of the current byte (which was used as a reference value of "X") plus the increment of 7.

In binary, the decimal number 15 is 1111, which should be interpreted as 1.111 where the figure to the left of the decimal point indicates how many bytes higher in the memory to add a 1 (i.e., 1 byte higher in this case) and the 111 to the right of the decimal point indicates to which bit (i.e., 111=7 in this case) the 1 should be added. Note that the result of summing the non-zero entries in a byte may give a 1 in the same byte. The result of summing for the bit pattern 00000011 for example, is the bit pattern 10000000 to the nearest approximation in the same byte.

However, a byte that originally contains only one non-zero entry will not be changed by collating 1's in the above manner. Therefore, a means is also provided by the present invention to collate 1's from different bytes. This is provided according to one embodiment of the present invention by setting a flag when the result of collating 1's in a byte does not leave the all the bits in the byte reset to zero. The flag may be precomputed for all possible 8-bit patterns and stored in the look-up table. When the flag is set, which may for example be the most significant, or "sign," bit of the look-up table output byte, the remaining bits of the look-up table output value can indicate the bit position in the byte which is left at 1 after collation. Upon performing collation on the next non-zero byte, if the flag is set from a previous collation operation, the left behind quantity from the previous operation is first combined with the lowest order non-zero bit of the new byte using the procedure previously described for combining bins in relation to FIG. 3. Thus, attempting to combine 8 bits at a time may speed up the summation process, but may not totally supplant the need to combine single bits.

Figure 5:
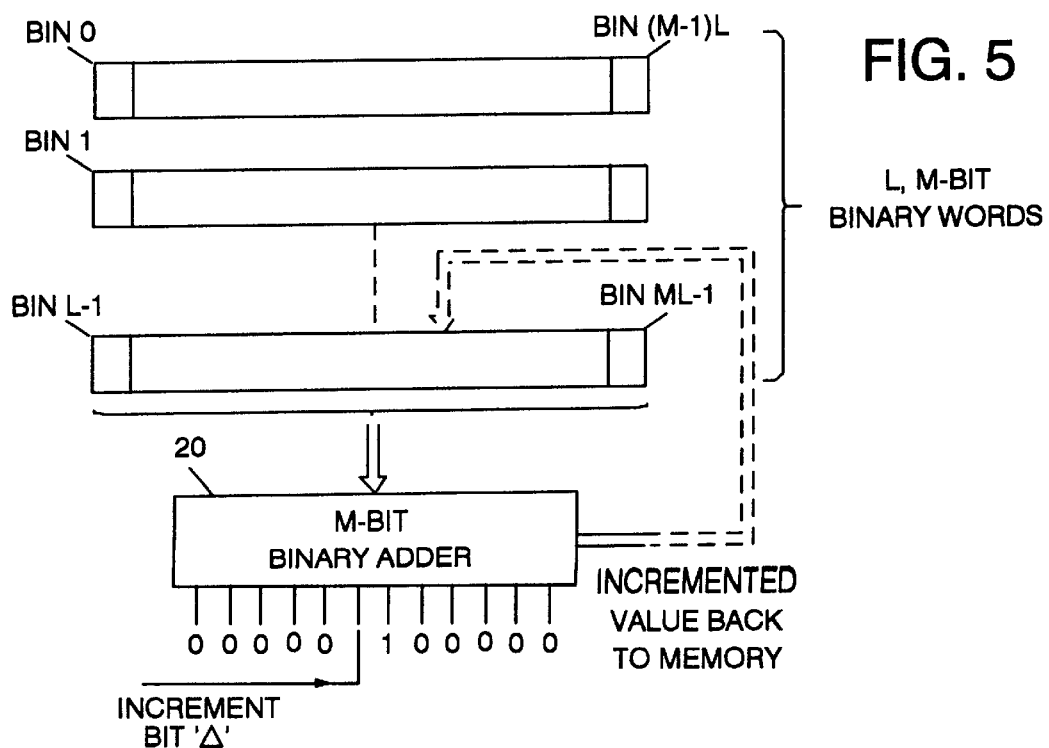
FIG. 5 schematically illustrates a further embodiment of an apparatus according to the present invention.

When, as illustrated in FIG. 3, bin 9 was incremented from 1 to 2, causing it to reset to zero and generate a carry to bin 15, the process is binary addition with carries that jump 6 bits at a time. By rearranging the compressed memory of FIG. 4 in the manner illustrated in FIG. 5, such that bits 6 apart appear in the same word, a conventional binary adder may be used for adding a 1 to any bit of the word. In general, if the logarithmic scale chosen has L bin separations representing 3 dB (or more accurately a 2:1 increase in the quantity represented), then every Lth one-bit bin may be made to lie in the same binary word. Thus, as illustrated in FIG. 5, a first word contains M bins 0, L, 2L . . . ; a second word contains M bins 1, L+1, 2L+1 . . . and so on to an Lth M-bit word which contains bins L−1, 2L−1, 3L−1 . . .

When any bin is to be incremented, the word which contains the bit corresponding to the bin to be incremented is read into binary adder 20, where it is added with another M-bit word containing all zeros apart from a 1 in the bit position which is to be incremented. The normal binary carry operation takes care of the carry requirements of the method. The determination of which bit is to be incremented was previously described, namely by collating pairs or more non-zero bits together using a look-up table to determine the bin number or bit position of a higher bin that must have "1" added to it to represent a quantity equivalent to the sum of the collated bins, i.e., bit number 15 in the above example. Thus collating 1's from the vertical column consisting of bins 0, 1, 2 . . . L−1 in FIG. 5 (i.e., across the least significant bits of all words) will, after addressing a look-up table using those L bits, be found equivalent to incrementing a particular bit in a particular word, which is then performed using adder 20. Alternatively, a look-up table can be precomputed for collating 1's horizontally, i.e., across the same M-bit word of FIG. 5. Because the bit-weights (represented signal magnitude) within one word are related in the binary series 1:2:4:8 . . . etc., this look-up table is the same look-up table for converting binary integers to logarithms that was used for reducing the histogram of FIG. 2 to the single-bit entries of FIG. 3. Either method may be used depending on which is most efficient for programming in a particular microprocessor instruction set or application.

A particularly simple method of logarithmically accumulating values will now be described with reference to FIG. 5. Suppose the total range of values that a receiver can measure is 128 dB, with measurements being represented by an 8-bit word having 0.5 dB least significant bit (LSB) value. More accurately, the LSB value is 10 LOG 10(2)/6, which is very close to 0.5. Thus, the bins of FIG. 5 form six words of 43 bits each, which gives 258 bins, enough to encompass the 256 possible values. Adjacent bits in each word represent energy levels a factor of two apart, and so an observed value is recorded simply by adding 1 to the appropriate bin number 0 to 255 as addressed by its 8-bit value. When a "1" is added to a bin, the ripple carry is allowed to flow through the word containing that bin. Because the most significant bit (MSB) of the word represents a very high energy level, no overflow is expected unless accumulating a very large number of strong-signal (high magnitude) values, but overflow can be prevented by allowing some headroom on the word length, by increasing the word length from 43 to 48 bits, for example. The MSB then represents an energy level approximately 32 times or 15 dB greater than the highest value.

After accumulating all values in this manner, the six, 48-bit words are each a partial logarithmic sum of the total energy and are then further combined to yield the final sum. This may be accomplished by logarithmic addition or by any of the methods described herein. Thus, the accumulation of arbitrarily large numbers of values is reduced to essentially the combination of six binary words, each representing a partial logarithmic sum from different "slices" of the total dynamic range separated by 0.5 dB.

Figure 6A:
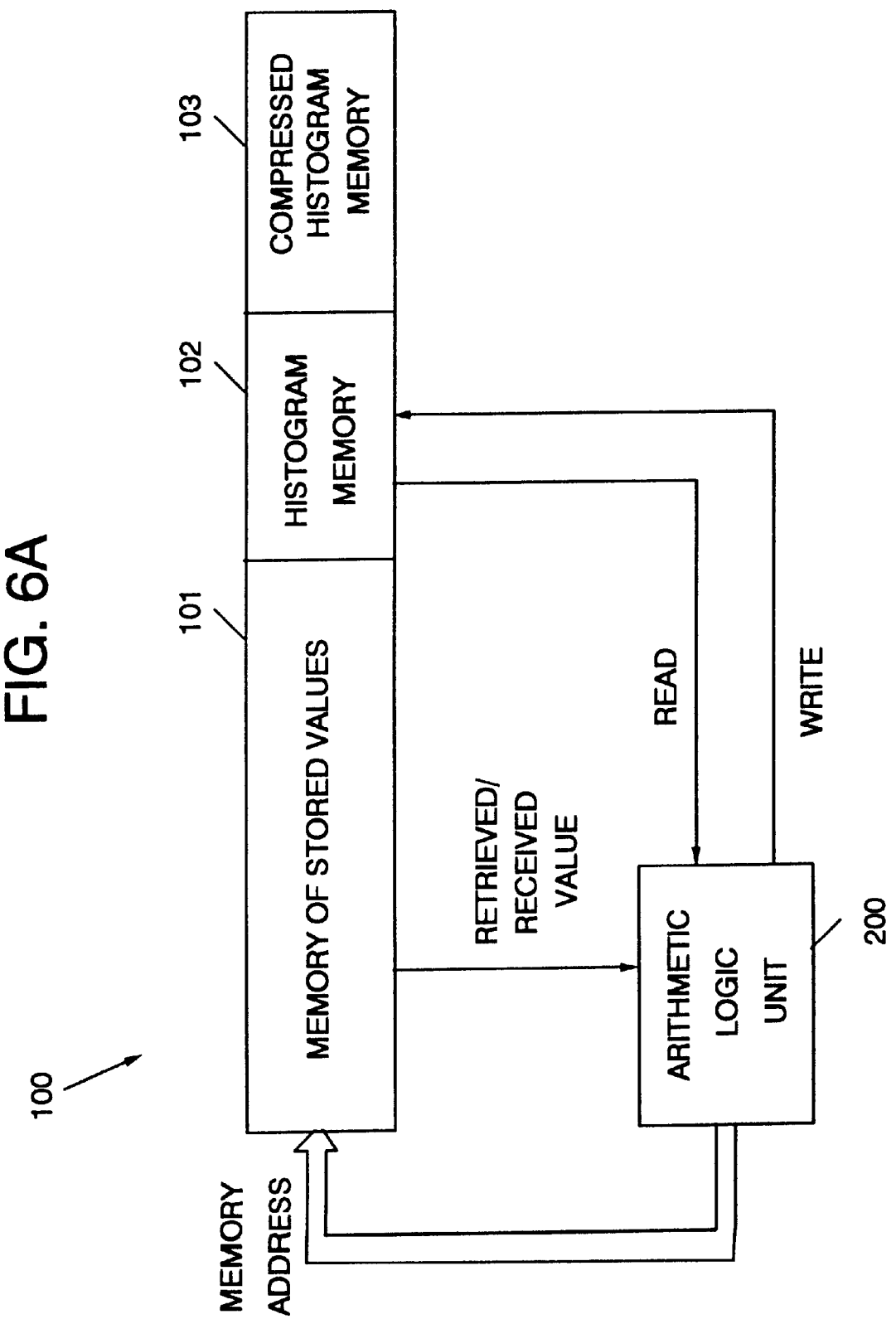
FIG. 6A is a schematic block diagram of a processor architecture according to an embodiment of the present invention.
Figure 6C:
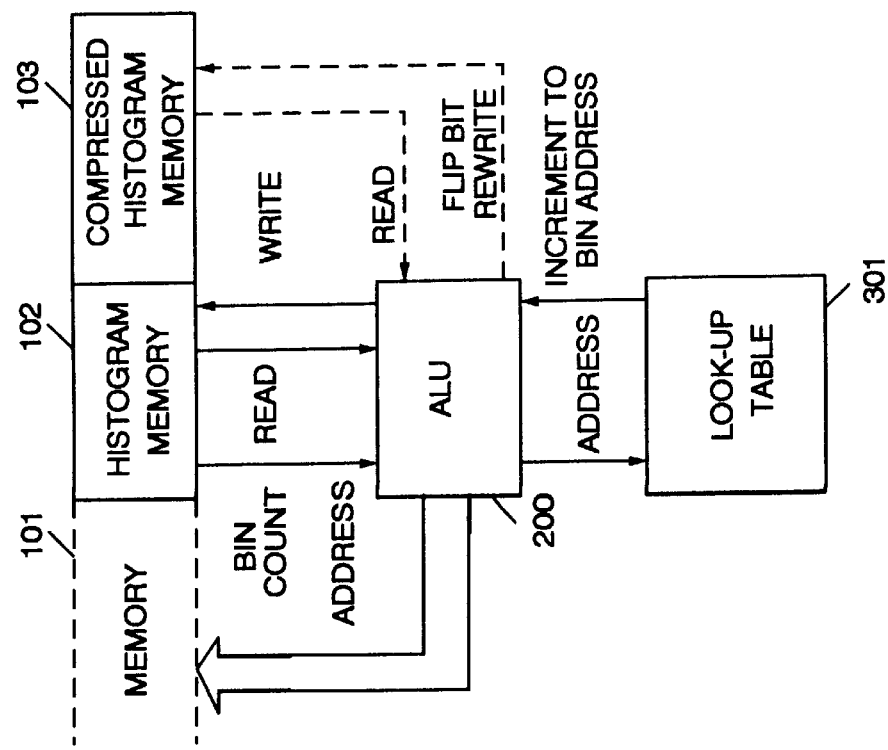
FIG. 6C is a schematic block diagram of a processor architecture according to a further embodiment of the present invention.
Figure 6B:
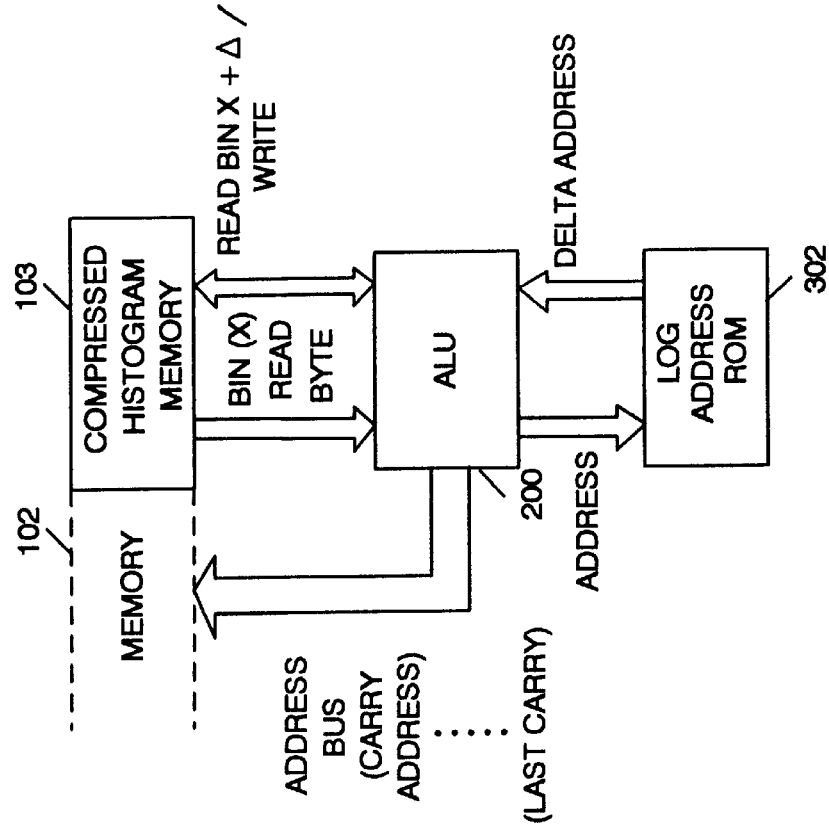
FIG. 6B is a schematic block diagram of a processor architecture according to another embodiment of the present invention.

FIGS. 6A, 6B, and 6C illustrate embodiments of an apparatus according to the present invention utilizing microprocessor architectures implementing the methods described above. In FIG. 6A, memory 100, including memory segments 101, 102, 103, is addressed by Arithmetic/Logic unit ("ALU") 200 which reads values from and/or writes values to memory 100. In providing for carrying out the objective of accumulating a plurality of logarithmic representation numbers, memory 101 provides a means for storing the logarithmic numbers to be combined and ALU 200 is controlled by a program to carry out the method aspects of the present invention including reading numbers sequentially from memory 101. Each read number is then used to address a particular bin of histogram memory 102 which is then incremented. When all numbers have been read from memory 101, memory 102 contains counts of how many times each discrete number occurred in memory 101.

FIG. 6B illustrates a system providing means for reduction of the histogram memory to the compressed form having only single-bit bins according to the method aspects of the presto read counts sequential previously. As illustrated in FIG. 6B, ALU 200 is programmed to read counts sequentially from histogram memory 102 and to use each count to address logarithmic look-up table 301. Look-up table 301 returns the logarithm of the count in terms of the increment to the current bin number needed to point to the bin number where a 1 should be placed to be equivalent to the total quantity in the histogram bin. This 1 can be written directly to compressed memory 103, by a read, increment and rewrite operation to take care of any carries that may result from the compressed memory already containing a 1 in the position to be incremented.

FIG. 6C illustrates the operation of collating 1's in compressed memory 103 to obtain the final logarithmic sum. In carrying out this operation, ALU 200 reads a byte at a time, which is applied to a second look-up table 302 that returns the logarithm of the sum of all the non-zero elements of the byte, in terms of an increment or delta-number of bins away from the current byte where a bit shall be incremented to represent the sum. ALU 200 adds the delta-number to the current byte address to obtain the address of the byte containing the bit to be incremented. That byte is then read, the appropriate bit incremented, and then carries are performed according to the method described above if the bit incremented was already a 1.

As will be appreciated by those of skill in the art, the above described aspects of the present invention in FIGS. 4, 5, 6A, 6B, and 6C may be provided by hardware, software, or a combination of the above. While the various components of the apparatus of the present invention have been illustrated in part as discrete elements in these Figures, they may, in practice, be implemented by a microcontroller including input and output ports and running software code, by custom or hybrid chips, by discrete components or by a combination of the above.

Figure 7B:
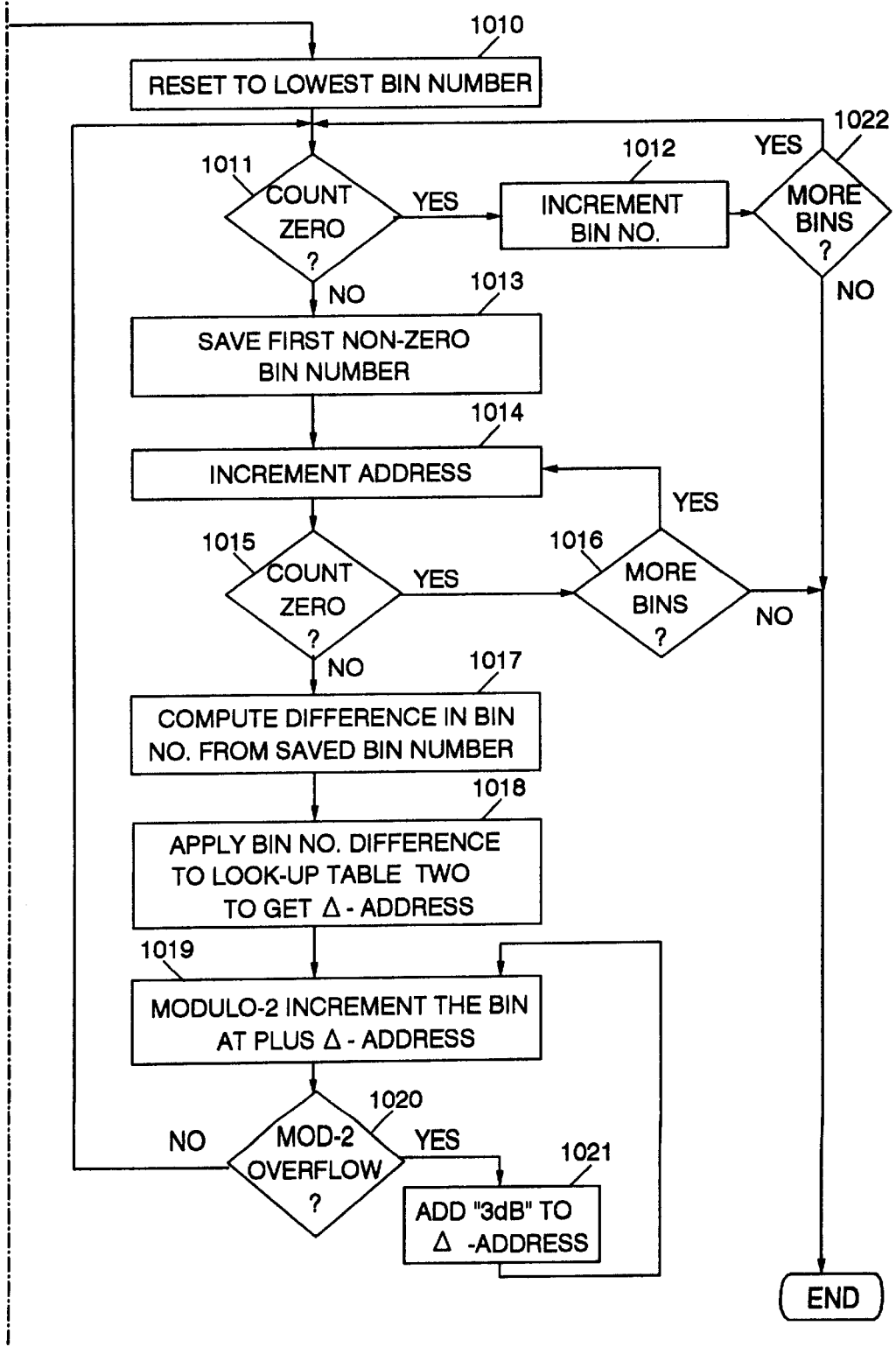
FIG. 7B is a flowchart illustrating operations according to an embodiment of the present invention.

FIGS. 7A and 7B are flowcharts illustrating operations of an embodiment of one aspect of the present invention. At block 1000, the histogram memory elements are reset to zero and are ready to accumulate a new set of numbers. At block 1001, an analog representation of a number, such as a signal strength measurement, is input to the A/D convertor, or, alternatively, a previously stored digital value of the number is retrieved from memory 101. The number is associated with an address in the memory 102 to be incremented at block 1002, thus recording an occurrence of that particular number. At block 1003, a test is made to determine if more input numbers shall be accumulated. If so, a return is made to block 1001 to get the next number, otherwise the method proceeds to block 1004 to begin reducing the complete histogram contained in histogram memory 102.

Processing at block 1004 begins with the lowest numbered bin, i.e., with the count contained in histogram memory 102 at an address containing a count giving the number of times the smallest number (possible magnitude value of the measured signal) was observed. The count indicating the number of times the smallest magnitude value was detected is retrieved from histogram memory 102. This count is used to address a look-up table at block 1005 to determine a bin number "delta" higher than the current bin number where a count of 1 is equivalent to a multiple count retrieved at block 1004. If the count at block 1004 already contains a value of 1, then operations at blocks 1005 to 1008 do not need to be performed. Otherwise, a count greater than 1 is reduced by incrementing, at block 1006, the count in the bin number "delta" higher than the current bin. At block 1007, a check for bin count overflow is made. If the increment resulted in an overflow such that the count became zero, the number of times that particular value (number) occurred exceeded the maximum bin count by one and the total of (MAXCOUNT+1)×VALUE is then equivalent to a count of 1 in a yet higher numbered bin which is always a constant number of bins away as determined by the logarithm of (MAXCOUNT+1). This constant number of bins is thus added to the value of "delta" at block 1008 and a return to block 1006 is made iteratively until no further overflows are detected at block 1007. Operations then proceed to block 1009 to determine if any further bins are to be processed. If so, a return is made to block 1004 to process the next bin. Otherwise, operations proceed to block 1010 with all bins now contain counts of only zero or one, multiple counts having been converted to single counts in an appropriate higher-numbered bin.

At block 1010, the current bin number is reset to the lowest numbered bin. Optionally, modifications can be made to effect return to the lowest numbered NON-ZERO bin, to avoid processing zero bins; however, block 1011 can alternatively be used to test for non-zero bins and to skip over them. When at block 1011 a non-zero count is detected, its bin number is saved at block 1013. At block 1014, the address is incremented to find the next non-zero bin number as determined by checking at block 1015. If at block 1016 it is determined that no more bin numbers exist, operations exit with the bin number saved at block 1013 indicative of the desired logarithmic sum. Otherwise, if a second non-zero bin is detected at block 1015, its bin-number spacing from the bin number saved at block 1013 is computed at block 1017 and the bin-spacing used to address a look-up table at block 1018 to determine a higher-numbered address where a count of 1 is equivalent to the sum of the values of the first non-zero bin (from block 1013) and the second non-zero bin (found at block 1015). The look-up table returns the delta-address from the last-found non-zero bin to be incremented. The bin at the delta-address location is incremented at block 1019, after resetting the last-found non-zero bin to zero. The purpose of the latter is that the bin incremented at block 1019 may be the same as the last-found non-zero bin (for example, if the sum of the values is insufficiently greater than the larger of the two resulting in a rounding showing no increase over the larger value for the sum). Thus, after block 1019, the last-found non-zero bin would then retain an unchanged count.

Another possibility is that the bin count may become greater than 1 after block 1020. Use of modulo-2 incrementing provides that the bin increments to zero in this event while indicating modulo-2 overflow. The overflow is detected at block 1020 and at block 1021 the spacing of a higher addressed bin is determined where a count of 1 is equivalent to a count of 2 in the current bin. Instead of a count of two in the current bin, a return is made to add a count of one into this higher addressed bin, and the process iterates in the form of a ripple-through carry effect until no overflow is detected at block 1020. A return is made to block 1011 with the bin-address still equal to the last-found non-zero bin address. The bin count may now be zero, in which case blocks 1011 and 1012 will skip over bins until a non-zero bin is found or until all bins have been tested. Thus, either the last-found non-zero bin address or a new non-zero bin address is saved at block 1013 and the process continues until an exit is made from block 1012 or block 1016 indicating that all bins are exhausted. The bin address saved at block 1013 is then indicative of the desired logarithmic sum.

Figure 8A:
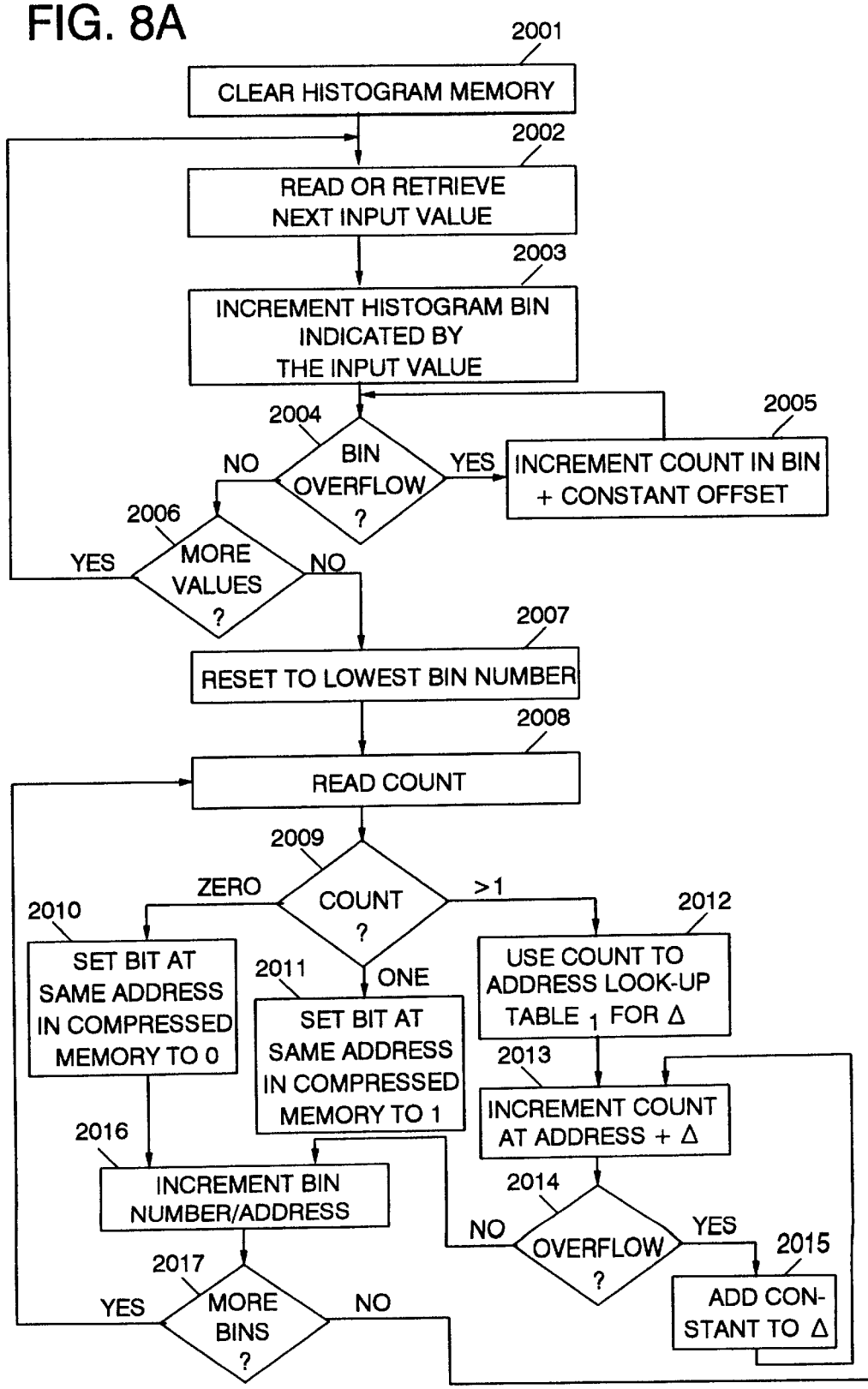
FIG. 8A is a flowchart illustrating operations according to another embodiment of the present invention.

As illustrated in FIGS. 7A and 7B, operations at blocks 1000 to 1009 effectively reduce multiple observations of a lower value into a single occurrence of a higher value. The novel method described here for logarithmic arithmetic is similar to the use of multiplication in ordinary, linear arithmetic instead of repeated addition. After reduction of multiple counts to single counts, the memory contains counts of only zero or one. Therefore, a more compact storage of these single bit values can be used. FIGS. 8A and 8B illustrate an embodiment of the present invention providing for the use of more compact storage to further accelerate logarithmic accumulation. Operations at blocks 2001 to 2017 provide for the construction and then the reduction of the histogram as described previously in connection with FIGS. 7A and 7B. However, additional details of these operations are illustrated in the embodiment of operations of FIGS. 8A and 8B that were not discussed in connection with FIGS. 7A and 7B. For example, in building a histogram of observed input measurement values (numbers), a test for bin overflow is made at block 1004 and the logarithmic carry to a higher numbered bin which is LOG (MAXCOUNT+1) higher (as described in connection with block 1007 of FIGS. 7A and 7B) is made at block 2005. Also, at block 2009, if the bin count is already zero or one the value may be directly recorded in compressed memory at blocks 2010 or 2011 respectively. Reduction of multiple occurrences need only be done as illustrated at blocks 2012 to 2015 when multiple occurrences are detected at block 2009. When at block 2017 it is detected that all bins have been reduced, operations continue at block 2018 to process the single-bit values now contained in compressed memory. For the illustrated embodiment of operations of FIGS. 8A and 8B, as compared to the embodiment of FIGS. 7A and 7B, single-bit counts are processed 8 bits at a time by processing bytes. However, it is to be understood that the benefits of the present invention are not limited to such an embodiment and may be obtained while processing any number of bits at a time by use of an appropriate sized look-up table at block 2021.

A byte (or word of determined length) retrieved from compressed memory at block 2019 is used, if not detected to be zero at block 2020, to address a look-up table at block 2021 to determine the spacing or bin number "delta" to a higher-numbered bin where a bit value of 1 in an appropriate bit position is equivalent to the sum of all numbers (measurement values) represented by all the non-zero bits of the current byte. The look-up table contains a "delta" address pointing to a byte to be incremented and a bit number within that byte to be incremented. The indicated bit in the byte at "address+delta" is then incremented modulo-2 at block 2022 and modulo-2 overflow is checked at block 2023. If overflow is detected, i.e., if the bit incremented to zero, then the count which would have been 2 is replaced by an increment of 1 to a higher-numbered bin representative of twice the amount. The higher-numbered bin is LOG(2) away from the current bin, and LOG(2) is thus the constant added to "delta" at block 2024. The ripple-carry loop comprised of blocks 2022, 2023 and 2024 is, as explained above with reference to FIG. 5, equivalent to normal binary addition if bits LOG(2) apart in compressed memory are chained together to form a binary word.

The sum of all the non-zero bits in a byte may at times result in a single 1 in the same byte; that is, at block 2021 the byte address "delta" is zero and the bit incremented at block 2022 is a bit in the same byte. Thus, the current byte is reset to zero in block 2021 before performing the increment at block 2022. If at block 2025 the current byte has remained reset to zero, it indicates that the contents of the byte have been transferred to a higher-numbered (addressed) byte. Otherwise, if the byte is not zero, it indicates that the contents of the byte remained with the byte and are to be carried forward. At block 2026, therefore, a carry flag is set to indicate the bit address of the remaining 1 in the current byte which must be accumulated with a higher-numbered (addressed) byte as will be explained more fully herein. If block 2027 operations detect that all bytes have been processed, an exit is made with the bit address of the last 1 in compressed memory indicative of the desired logarithmic sum. Otherwise, the byte address is incremented at block 2028 and a return made to block 2019 to continue processing bytes.

In FIGS. 7A, 7B, 8A and 8B, when the maximum bin count, denoted by MAXCOUNT, is exceeded a carry to a higher order bin is executed. In compressed memory, when a value of 1 is incremented, a carry is likewise made to a higher numbered bin. The latter is the same as the former when MAXCOUNT is equal to one. Thus by setting MAXCOUNT equal to one, it is possible to directly accumulate the histogram of values in single-bit memory, as is illustrated by the flowchart of operations of FIGS. 9A and 9B.

Figure 9A:
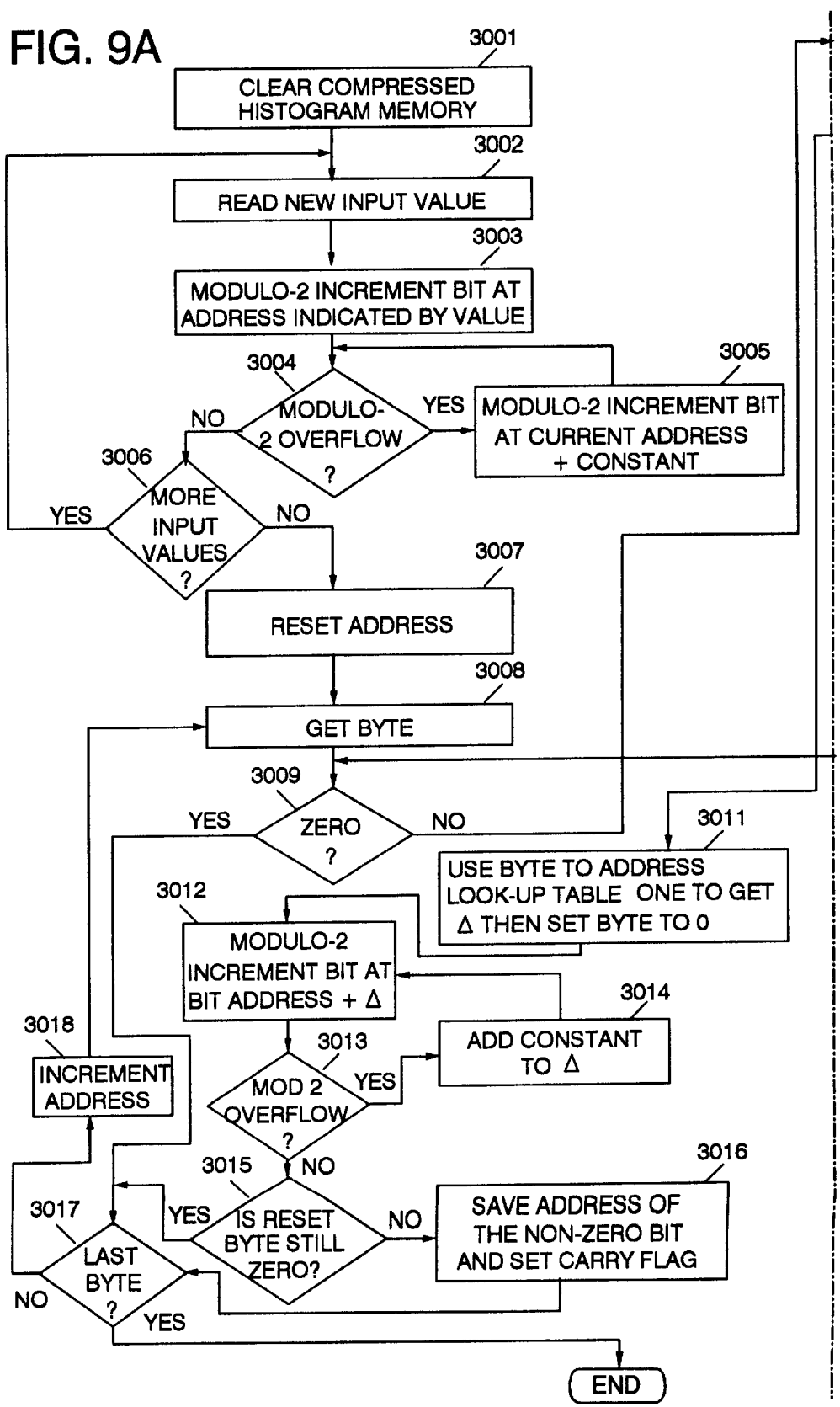
FIG. 9A is a flowchart illustrating operations according a further embodiment of the present invention.
Figure 9B:
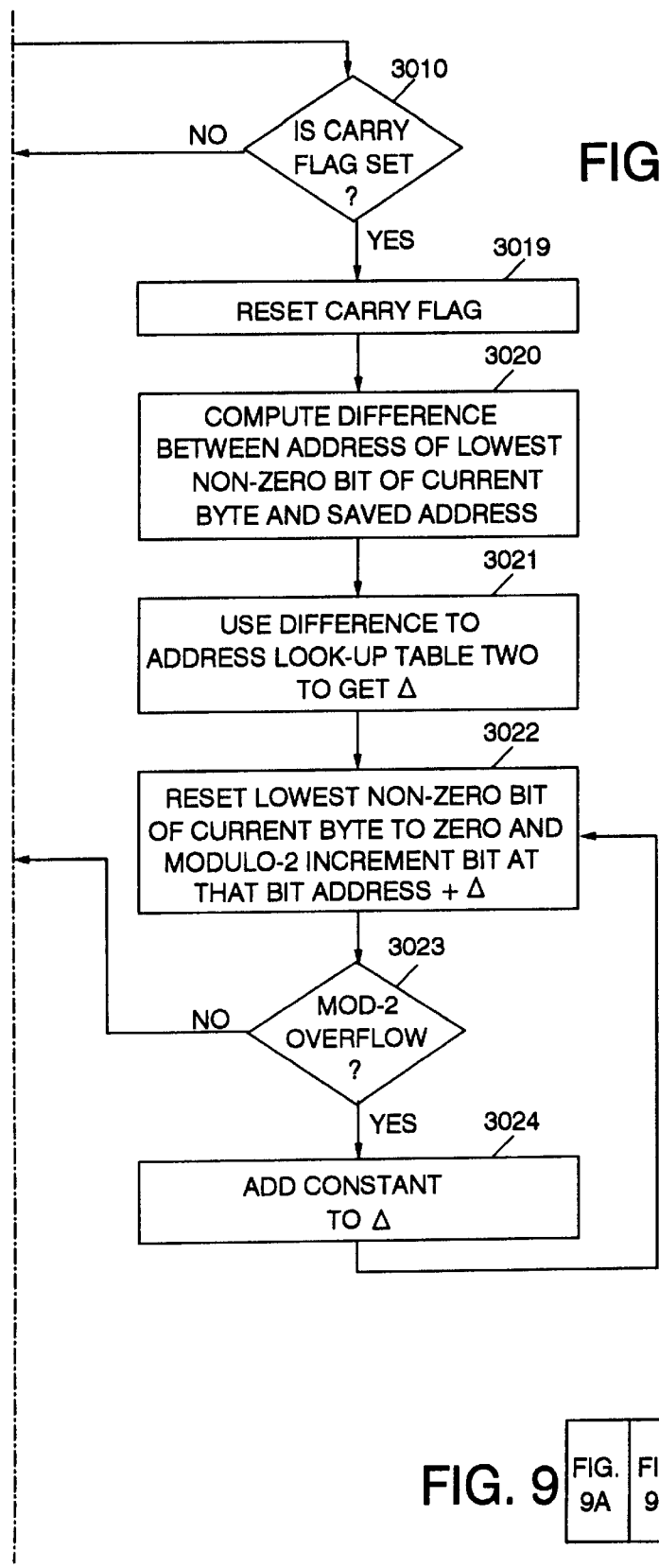
FIG. 9B is a flowchart illustrating operations according a further embodiment of the present invention.

Referring now to FIGS. 9A and 9B, operations for the illustrated embodiment start at block 3001 by clearing all bits to zero. A new measurement value (number) is then input at block 3002, the value indicating the address of a bit in memory to be incremented. The incrementing is performed modulo-2 at block 3003, with ripple-through carry being detected at block 3004 and propagated at block 3005, for example by chaining together bits LOG(2) apart in memory to form a binary word. When all measurement values (numbers) are detected to have been input at block 3006, the method continues from block 3007 just as from block 2018 of FIGS. 8A and 8B. In FIGS. 9A and 9B, details of the carry flag usage are further illustrated.

Starting at block 3007 with the first byte, its value is retrieved at block 3008 and tested at block 3009. If it is zero, a skip is made to block 3017 which detects whether all bytes have been processed. If not, the byte address being processed is incremented at block 3018 and a return made to block 3008 to get the next byte. When the byte is non-zero, operations at block 3010 check if the "carry flag" is set. The carry flag indicates if a previously processed byte was left in a non-zero state. If so, blocks 3019 to 3024 bring forward the value of the previously processed byte to accumulate with the current byte. In one embodiment these operations are provided by accumulating the non-zero bit of the previously processed byte with the lowest non-zero bit of the current byte.

As was described previously, logarithmic accumulation preferably accumulates values in the order smallest to next smallest in order to minimize rounding effects. At block 3020, therefore, the bit-spacing is determined between a previously processed bit which remains a non-zero value and the lowest non-zero bit of the current byte. This bit position difference is applied to a look-up table at block 3021 to obtain the higher bit address representative of the sum of the two non-zero counts. The bit address returned from the look-up table may be the same bit as the lowest non-zero bit of the current byte (where rounding results in no increase because of the relative value difference with widely spaced bit values), so that the lowest non-zero bit of the current byte bit is reset to zero at block 3022 before incrementing the bit at the higher bit address representative of the sum of the two non-zero counts. If modulo-2 overflow is detected at block 3023, a carry is made to the bit LOG(2) higher whose address is determined at block 3024. This is also equivalent to binary addition when bits LOG(2) apart are chained to form a binary word. When the carry has fully propagated, a return is made to block 3009 to determine if the current byte is now zero and the process continues from that point.

If at block 3010 the carry flag is not set, any previous carry flag having been reset at block 3019, the values represented by all the non-zero bits of the byte are collated at block 3011. This is done for the illustrated embodiment by using the byte to address a look-up table giving the address of a higher-numbered bit to receive an increment representing the sum. The bit at the higher-numbered address is then incremented at block 3012, and any carry is dealt with by carry propagation loop blocks 3013, 3014 and 3012 which may also operate by means of ordinary binary addition as above. When the carry is fully propagated, block 3015 checks if the current byte is now zero or not. If it is zero, its entire contents have been collated into a higher byte and it may be forgotten. Otherwise, a non-zero bit remains in the byte being processed, the carry flag is set at block 3016, and the bit address of the non-zero bit is saved. Block 3017 then determines if further bytes are to be processed, and if not, an exit is made with the saved bit address indicative of the desired logarithmic sum. The operations for various embodiments of the present invention described above may be further modified by a person skilled in the art desirous of efficiently accumulating a large number of values represented on a logarithmic (or other non-linear but monotonic) scale.

The present invention has been described above with respect to FIGS. 7A, 7B, 8A, 8B, 9A, and 9B with reference to flowcharts illustrating the operation of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Accumulation of Signed Logarithmic Numbers

The aspects of the present invention described above related to processing of unsigned numbers. Another aspect of the present invention is directed to the accumulation of signed logarithmic values. By way of background to understanding the accumulation of signed logarithmic value aspects of the present invention, an explanation of Zech logarithms, which are known to one of ordinary skill in the art, will first be provided. When the precision needed for logarithmic arithmetic in limited, additions and subtractions may be performed using Zech logarithms as follows:

Suppose a=log(A) and b=log(B) and the value of the logarithm of the sum of "A" and "B" is to be computed, i.e.

Find: $c=\log(C)$ where $C=A+B$ $$C=\log(A+B)=\log(e^a+e^b)$$

for the case where "e" is the base of the logarithms involved. Thus $c=a+\log(1+e^{-(a-b)})$ which is most useful when $a>b$, or $c=b+\log(1+e^{-(b-a)})$ which is most useful when $b>a$.

For subtraction, the expression becomes:

$c=a-(-\log(1-e^{-(a-b)}))$ or $c=b-(-\log(1-e^{-(b-a)}))$.

Accordingly, the following functions need to be computed to obtain the desired answer:

$y=Z_+(x)=\log(1+e^{-x})$ or $y=Z_-(x)=-\log(1-e^{-x})$ where $x=|a-b|$ is always positive and the choice of y equal to the negative logarithm for subtraction conveniently makes y always positive.

These functions, $Z_+(x)$ and $Z_-(x)$, are Zech logarithms, which may be performed using precomputed look-up tables addressed by the value of "x," as long as the precision of "x" required does not extend to too many bits. For example, the use of Zech logarithms to perform logarithmic addition (in the context of a communications signal processor of limited precision) was described by Dr. N. G. Kingsbury in his Ph.D. thesis at Cambridge University England, ca 1970. Excessive numbers of bits of precision would lead to look-up tables of excessive size. Given the present state of memory technology, 16-bit values of "x" leading to 16384 words of look-up table or Read Only Memory (ROM) are not excessive. While such a ROM may presently consume more silicon area on a silicon integrated circuit than a 16×16-bit multiplier, it can beneficially be designed to consume less power. Reduction in power consumption is particularly desirable in battery operated equipment such as laptop computers and cellular phones.

The previously described aspects of the present invention are directed to efficiently summing a plurality of logarithmically-represented numbers (or measured values). The need to perform such a summation can arise in various applications such as averaging signal strength. Another example is performing a correlation between a first set of values $A_1, A_2, A_3 \ldots A_n$ and a second set of values $B_1, B_2, B_3 \ldots B_n$ which is the same as forming the dot product between two n-dimensional vectors. First, corresponding values such as Ai and Bi are multiplied, for "i" ranging from 1 to n. This operation is simplified to addition when Ai and Bi are in logarithmic representation as discussed previously in the background section. The 'n' quantities Ci=Ai.Bi are then summed. However, these values may be signed quantities. The summation may be beneficially provided by the aspects of the present invention directed to accumulation of signed logarithm numbers which provide for handling of negative quantities as will now be described.

The first step in the signed accumulation aspect of the present invention is to form the histogram or count of all the different Ci values that occur. To handle negative quantities, each histogram bin is allowed to hold negative or positive counts to indicate the excess of occurrences of a positive value over the negative occurrences of the same magnitude. For example, if the signed logarithmic value +137 was observed 59 times and the signed logarithmic value −137 was observed 25 times, the count in bin 137 would be 59−25=34, indicating that negative values offset 25 of the 59 positive values, leaving a net 34 count of positive values. A net count of zero would indicate that the number of negative occurrences of that value equaled the number of positive occurrences, offsetting each other completely. A count of zero thus represents a true zero which is a value which is not represented in pure logarithmic representation.

The signed accumulation in counters may be implemented by accumulating the occurrences of the same log-magnitude in counters as described previously, but using the sign to determine whether the counter (bin) increments or decrements.

Once all of the Ci values are counted, operations for reducing the bin counts proceeds in a manner similar to that which was previously described for accumulation of unsigned numbers to reduce multiple net occurrences of one value to a single occurrence of another value. Multiple net positive occurrences are reduced as previously described to an increment of "1" that must be applied to another counter (bin). In addition, however, multiple net negative occurrences of a value are combined by decrementing another selected counter (bin). When an increment or decrement results in bin underflow or overflow, a carry or borrow is generated to increment or decrement, respectively, a higher-numbered bin. After the reduction process, all bins will contain a count of −1,0 or +1, and must, therefore, be at least 2-bit bins. The number representation used for counts of −1, 0 or +1 can be provided by a variety of protocols, for example, the two-bit binary representation

00=0
01=+1
11=−1 or, for example, the representation

00=0 no occurrences of either a positive or negative value
01=+1 an occurrence of a positive value
10=−1 an occurrence of a negative value
11=then represents an occurrence of both a positive and a negative value of the same magnitude, which, however, will already have offset each other to yield 00, so the bit pattern 11 should not occur.

In a further embodiment of the signed accumulation aspect of the present invention, one set of bins (counters) is used to accumulate a histogram of occurrences of positive values and another set of bins (counters) is used to accumulate negative value occurrences. After separate reduction to counts of one or zero in each set of bins, single occurrences of a positive value are allowed to offset (cancel) single occurrences of a corresponding negative value. This may, optionally, be implemented by exclusive ORing the two sets of reduced bins, treating them as binary words, to obtain a mask with zeros in the positions where neither a negative nor a positive value occurred and also zeros in positions where both a negative and a positive value occurred. The mask is then logically ANDed with the two sets of bins to cancel values of opposite sign.

As with unsigned accumulation, the greatest accuracy is expected to be obtained by combining values in the order lowest magnitude before highest magnitude. When a negative value of lower magnitude (i.e., lower bin number (address)) is combined with a positive value of greater magnitude (i.e., higher bin number) the result will be a positive value of bin number equal to or lower than the bin number of the positive value. However, in contrast to unsigned values, the resulting bin number may be lower than the bin number of the smaller (negative) value. Therefore, combining values does not, when reducing signed numbers, lead necessarily to an emptying of bins from lower to higher addresses, but can lead to an extension backwards of the bin addresses containing non-zero counts. Nevertheless, the process will typically be expected to converge rapidly as such very small quantities, when combined with quantities progressively higher up the ladder, will not move their bin numbers significantly up or down. Small quantities produced when nearly equal positive and negative values are combined will, therefore, be expected to exist very transitorily. Nonetheless, these values are preferably still checked for, in distinction to the reduction of unsigned values where combination should not result in a smaller value than either of the values combined.

For the signed logarithmic value aspects of the present invention, the Zech logarithm approach previously described is utilized. More particularly, the look-up tables used for combining values contain the precomputed Zech logarithms referred to above.

Addition or Subtraction of Signed Logarithmic Numbers With Increased Precision

While the aspects of the present invention described above are directed to accumulation of a large quantity of signed logarithmic numbers, they are primarily directed to applications where a limited precision is required. Some applications, however, require accumulation of a more limited quantity of logarithmic values but with greater precision. According to a further aspect of the present invention which will now be described, methods, apparatus and computer program products are provided which efficiently combine a first and a second number each having a sign and a logmagnitude. This aspect of the present invention provides for performing logarithmic addition or subtraction with higher precision.

By way of background, the formulae for logarithmic addition are:

$$c = \log(c) = \log(A + B) - \log(e^a + e^b) = a + \log(1 + e^{-(a+b)})$$
$$\text{or} \quad = b + \log(1 + e^{-(b+a)})$$
$$\text{or} \quad = (a+b)/2 + \text{logcosh}(|a-b|/2) + \log(2)$$

The respective formula are preferably utilized when a>b, b>a and when a and b are almost equal, respectively.

In extended precision arithmetic, for example when the values of a and b are expressed as digital values, a and b have a longer word length in bits. The function $x = |a-b|$, on which the addition depends, may further be treated as having a most significant part x1 and a least significant part x2. When the function x is treated as having parts x1 and x2 the addition of the two numbers with a sign and a logarithmic magnitude may be expressed as involving computing terms such as $\log(1+e^{-(x1,x2)})$ where (x1,x2) means x1 concatenated with x2.

While a variety of ranges of precision may be desired in processing numbers expressed as a sign and a logmagnitude, a typical example would be providing a and b as 32-bit numbers comprising a 1-bit Sign and a 31-bit logmagnitude. For example, a common floating point representation comprises a Sign, an 8-bit exponent and a 24-bit Mantissa which may be reduced to 23 bits by left shifting until the most significant bit is always a 1 (the 1 may then be dropped and just implied). The exponent range for this floating point format is two to the power +127 to two to the power −128, and the numbers can thus be represented that have magnitudes from $10^{-38}$ to $10^{+38}$.

This same range of magnitudes can be represented by power of "e" between +88 and −88. Therefore, floating point representation of numbers can be provided using a 7-bit whole-number part for the logarithm to the base "e" to represent the slightly lesser range of $10^{-27}$ to $10^{+27}$. Alternatively, an 8-bit whole part can be used, as in typical floating point, to represent the greater range of $10^{-55}$ to $10^{+55}$. If the latter is chosen, a 23-bit fractional part of the logarithm can be accommodated within the same 32-bit word length. The least significant bit then represents two to the power −24. It then follows that $d(\log(x))=2^{-24}=dx/x$. The value of "x" is, therefore, represented with constant fractional accuracy of $2^{-24}$ or, approximately, one part in 16 million.

Therefore, with this format of representation, when two quantities that differ by this factor (i.e., the larger is approximately 16 million times the value of the smaller) or a greater factor are added or subtracted, no change will be made in the least significant bit of the larger quantity. Two quantities differ by more than a factor of 16 million if their logarithms to the base "e" differ by more than approximately 16. Accordingly, if $x=|a-b|$ is greater than 16, no addition or subtraction need be performed and the result is simply the greater of a or b (along with its associated sign bit).

Applying this limitation from the precision of expression of the logarithmic values allows the present invention to combine two values with relatively high precision efficiently. More particularly, according to the present invention, only values of x1, the most significant part of x (which represents the difference between a and b as described above), that are less than approximately 16, i.e., having 4 or at most 5 bits to the left of the decimal point, are considered. For the illustrative embodiment of the high precision combination aspects of the present invention, there are 23 bits to the right of the point (the fractional part described above). Therefore, (x1,x2) has at most 28 significant bits (i.e. bits that will be considered). The 28 bits are preferably equally split between x1 and x2, making x1 a 14-bit most significant part of the form xxxxx.xxxxxxxxx (allowing for 5 bits to the left of the decimal point) and x2 a least significant 14-bit part.

The Zech logarithms $Z_+(x)$ and $Z_-(x)$ discussed above in this case can be expressed as follows:

$$Z_+(x)=Z_+(x1,x2)=Z_+(x1^+)+Z_+(x') \} \quad (1)$$

where $$x'=x+Z_+(x1^+)+Z(x2) \}$$

As used in equations (1) and below, $x1^+$ means x1 incremented by one least significant bit (LSB) and x2 means the 1's complement of x2, i.e., (10000000000000−x2).

Furthermore, $$Z(x)=Z_-(x1,x2)=Z_-(x1^+)+Z_-(x') \} \quad (2)$$

where $$x'=x-Z_+(x1^+)+Z_-(x2) \}$$

This use of most and least significant parts to define separate components of the Zech logarithm equations can be iteratively repeated by similarly expressing x' as having a most significant part x1' and a least significant part x2'. The Zech, $Z_\pm(x')$ can be expanded likewise in terms of an x" and so forth. This can be expressed mathematically by substitution into in equations (1) and (2) as follows:

$$Z_+(x)=Z_+(x1,x2)=Z_+(x1'^+)+Z_+(x1''^+)\ldots\} \quad (3)$$

and $$Z_-(x)=Z_-(x1,x2)=Z_-(x1^+)+Z_-(x1'^+)+Z_-(x1''^+)\ldots\} \quad (4)$$

The values x1, x1', x1" and so on in equations (3) and (4) therefore become successively larger by at least the values of $Z_-(x2)$, $Z_-(x2')$ and so on which in turn are at least $-\log_e(2^{-9})$ which equals 6. Accordingly, after three terms of the series, the remainder is the Zech logarithm of a value of x larger by about 18 (3 times 6) than the original x value. The whole number part is, therefore, greater than 16, which, as explained above, should not affect the least significant bit of the result of the combination of the two numbers. In other words, for the precision of the illustrated example, equations (3) and (4) converge after three terms to a result accurate to the 32-bit word length of the illustrated example.

Execution of the operations to perform the combination of the two numbers as described above utilizes the functions $Z_\pm(x1^+)$ and $Z_-(x2)$. These functions, are preferably precomputed and stored in look-up tables. For the illustrated example where x1 and x2 are 14-bit quantities, this results in 16384 word-size look-up tables.

Figure 10:
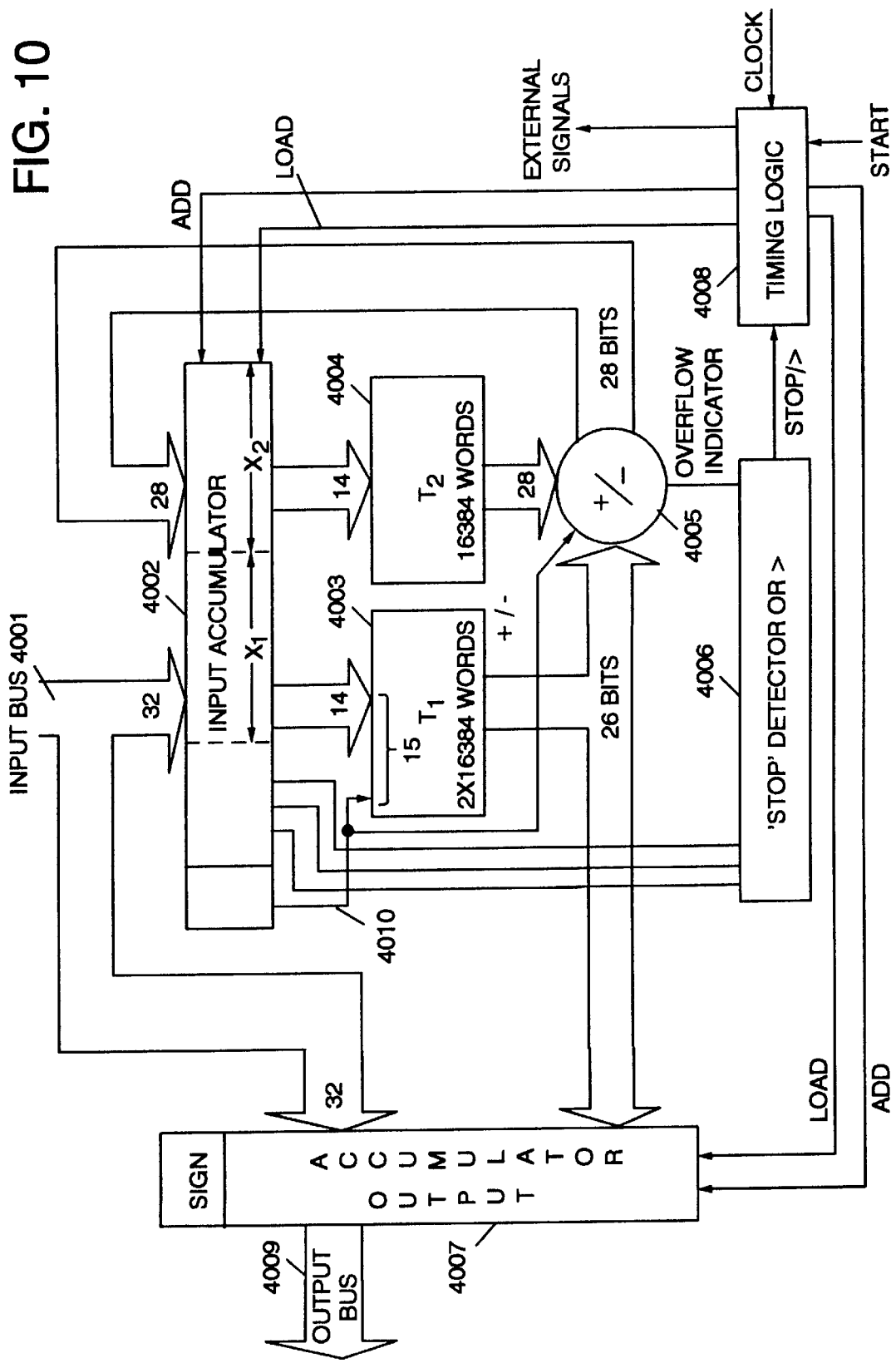
FIG. 10 is a schematic block diagram of a processor architecture according to an embodiment of the signed logarithmic accumulator aspect of the present invention.
Figure 11:
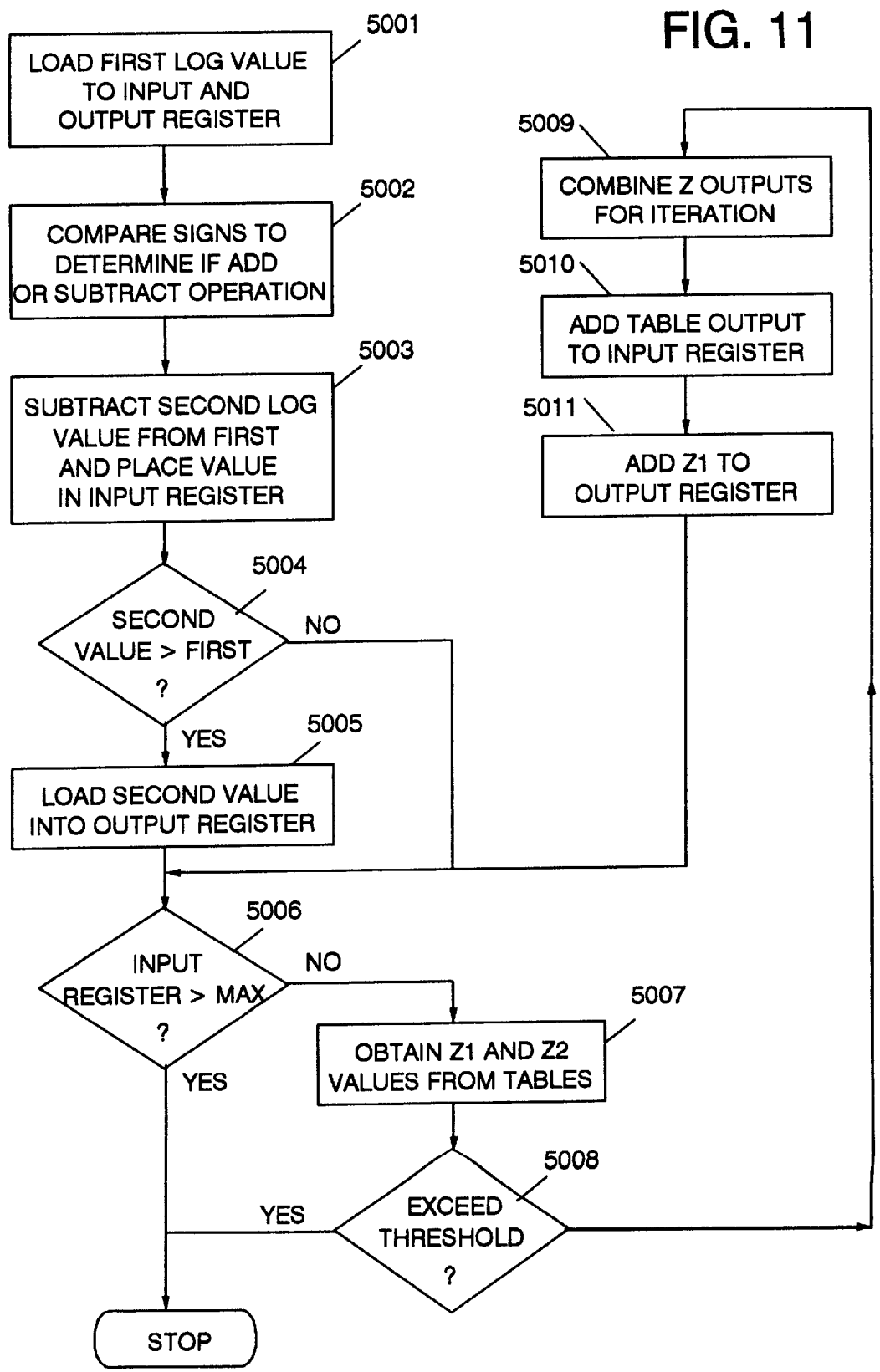
FIG. 11 is a flowchart illustrating operations according to an embodiment of the signed logarithmic accumulator aspect of the present invention.

Referring now to FIGS. 10 and 11, an embodiment of an apparatus according to the higher precision combination of signed logarithmic number aspect of the present invention and operations of the apparatus will now be described. The illustrated embodiment of FIG. 10 is shown according to the format of the illustrative example described above with x1 and x2 expressed as 14-bit quantities. Accordingly, first table (T1) 4003, or other storage means, as illustrated in FIG. 10, is a 32768 word look-up table which contains both $Z_+$, and $Z_-$ values of the augmented x1 value. Second table (T2) 4004, or other storage means, is a 16384-word table which contains the values for Z(x2). Tables 4003 and 4004 may be implemented as allocated blocks of memory on a computer carrying out the logarithmic number combination operations of the present invention.

As illustrated in FIG. 10, numbers to be combined are input to the apparatus over input bus 4001 which is a 32-bit bus that accepts input quantities (numbers) to be added or subtracted. The first number, which will be referred to as "a", is applied to input bus 4001 and a start signal is provided to timing logic 4008 to initiate operations. Timing logic 4008 issues a load signal to input accumulator 4002 which then loads the first number "a" from input bus 4001 into input accumulator 4002. Timing logic 4008 further provides a load signal to output accumulator 4007 which then loads the first number "a" into output accumulator 4007 from input bus 4001. Operations for loading accumulators 4002, 4007 are further illustrated in the flowchart of FIG. 11 at block 5001.

The second number to be added or subtracted, which will be referred to as "b" is then applied to input bus 4001. Timing logic 4008 issues a second load pulse to input accumulator 4002 causing the second number "b" to be subtracted from the already loaded number "a." As one of ordinary skill will appreciate, accumulators providing for subtraction of a second number from a previously loaded number are known in the art. As will be understood by one of ordinary skill in the art, an accumulator suited to use with the present invention may be provided that subtracts a value applied on the input bus but adds a value applied on the feedback bus. As illustrated in the embodiment of FIG. 10, this subtraction operation provides for subtraction of the 31-bit logmagnitude parts. The separate sign bits of "a" and "b" are Xored to determine if the quantities represented by "a" and "b" were of the same or different sign. If the signs were different, input accumulator 4002 outputs a "subtract" signal on add/sub output 4010. Add/sub output 4010 is connected to first table 4003 to provide the 15$^{th}$ address bit of first table 4003. Add/sub output 4010 is further connected to adder/subtractor circuit 4005 to provide an indicator to adder/subtractor circuit 4005 to subtract when "a" and "b" are different signs. When "a" and "b" are the same sign, input accumulator 4002 outputs an "add" signal on add/sub output 4010. Sign comparison operations are shown in the flowchart of FIG. 11 at block 5002. Operations by input accumulator 4002 for subtracting a second number from a first number previously loaded in input accumulator 4002 and placing the result in input acccumulator 4002 are illustrated at block 5003 of FIG. 11.

For numbers "b" having a logmagnitude greater than the logmagnitude of the number "a" which is being combined with "b", the subtraction of the respective 31-bit logarithmic parts, as described above, results in a negative value. In other words, as to the absolute value magnitude of the logmagnitude part of numbers "a" and "b", "b"represented the greater quantity. This condition is detected by stop/greater detector 4006 responsive to which stop/greater detector 4006 provides a signal to timing logic 4008. Operations of the apparatus of FIG. 10 for comparing logmagnitudes of the first and second number are illustrated in FIG. 11 at block 5004. Timing logic 4008, responsive to an indication of "b" representing the greater value, issues a second load pulse to output accumulator 4007 to load the value of "b" into output accumulator 4007 (overwriting the original value of "a") as further illustrated in FIG. 11 at block 5005. Accordingly, output accumulator 4007, following the operations at block 5005 contains the value of "a" or "b" having the greater magnitude including its respective Sign bit.

Furthermore, when input accumulator 4002 becomes negative after subtracting the second input value "b" (i.e., "b" having the greater magnitude), input accumulator 4002 outputs the complement of its contents, i.e., the modulus |a−b|. When the modulus |a−b| is greater than a threshold (related to the overall precision, and in the range 16–18 in the 32-bit illustrative example described previously), stop/greater detector 4006 provides a STOP signal to timing logic 4008. The most significant bits of input accumulator 4002 are provided to stop/greater detector 4006 to allow stop/greater detector 4006 to detect a modulus greater than the predetermined threshold. Responsive to the STOP signal, timing logic 8 halts computation and provides an indication, for example to an external computer (not illustrated) which is providing the numbers to be combined that the combination operation is complete. At this point, the desired answer is contained in output register 4007 which is accessible to the external computer over output bus 4009. Operations are stopped when the disparity between the magnitudes are too great (exceed the predetermined threshold) because, as discussed above, the combination operation will produce a result matching the larger value given the precision limit of the word size selected to represent the numbers. The operations for detecting that the threshold has been exceeded are illustrated in FIG. 11 at block 5006.

Alternatively, if |a−b| is not yet greater than the precision threshold, the least significant 14 bits (comprising x2) of input accumulator 4002 are provided to address second table 4004 to obtain the value Z_(X2) stored in second table 4004. The next 14 more significant bits (comprising x1) are applied to first table 4003 to obtain either the value $Z_+(x1^+)$ or $Z_-(x1^+)$. The value for the respective addition or subtraction Z value is retrieved according to whether the signal from add/sub output 4010, provided as the most significant address bit to first table 4003, indicates addition or subtraction. The value of $Z_+$ of the augmented value of x1 in the illustrated embodiment is less than $log_e(2)=0.69$ in all cases, and is therefore provided with only a 23-bit fractional part. The value of $Z_-$, however, may be a maximum of $-log_e(2^-9)=6$ when x1 is zero. Therefore, a 26-bit output is provided from first table 4003. Operations for obtaining Z values are illustrated in FIG. 11 at block 5007.

When second table 4004 outputs a value (x2) greater than the selected precision threshold (i.e., 16 to 18 in the illustrative example) further iteration is not expected to change the value already stored in output accumulator 4007. Accordingly, second table 4004 may be configured to provide output values of just under 31, i.e., having a 5-bit part to the left of the decimal point. Adder/subtractor 4005 provides means for combining the output values from tables 4003, 4004. When adder/subtractor 4005 detects that the result of combining output values from tables 4003, 4004 is greater than the predetermined precision threshold, adder/subtractor 4005 sets an overflow indicator which is operatively connected to stop detector 4006. Responsive to an overflow indication from adder/subtractor 4005 adder/subtractor 4005, to stop detector 4006 provides a stop signal to timing logic 4008 indicating that the desired precision is reached. Overflow detection operations arc illustrated in FIG. 11 at block 5008.

When no overflow is detected, the output of adder/subtractor 4005 (less than or equal to 28 bits long) is provided back to input accumulator 4002. As illustrated in FIG. 11 at block 5009, adder/subtractor combines the output values from tables 4003, 4004 for iteratively providing back to input accumulator 4002 when the precision threshold has not been exceeded. In the illustrated embodiment, the 28 bit length is applicable as if the output is less than 28 bits long no overflow is detected. If it was more than 28 bits long, overflow would have been detected. Timing logic 4008 issues an "add" pulse responsive to which input accumulator 4002 accumulates the output from adder/subtractor 4005 with the previous value contained in input accumulator 4002 as illustrated at block 5010 of FIG. 11(thereby generating one of the values in the succession x', x", ... ). Timing logic 4008 also issues an "add" pulse to output accumulator 4007 to accumulate the value or $Z_+(x1)$ from first table 4003 with the previous contents of output accumulator 4007 as illustrated at block 5011 of FIG. 11.

As described above with respect to FIGS. 10 and 11, operations were detailed for an iteration of the series of values utilized to calculate equations (3) or (4). To complete the calculation of all the terms up to the desired precision level, operations continue, as illustrated by the return from block 5011 to block 5006 in FIG. 11, to accumulate terms of equation (3) or (4) in output accumulator 7. The precision threshold is expected to be obtained within 3 cycles for the illustrated example above with 32-bit precision. Accordingly, when practicing the invention, a high 32-bit precision logarithmic addition or subtraction may be performed approximately every 4 logic clock cycles.

Performing enhanced precision operations on signed logarithmic numbers according to the present invention is of complexity comparable to or less than that of floating point adders of similar precision. However, the present invention provides the advantage of logarithmic representation for multiplication, division, squares and square roots. Furthermore, these operations are considerably less complex than their floating point equivalents and can be performed every logic clock cycle.

In addition, the apparatus, methods and program products of the present invention allow performance on a processing system, such as a computer, of both a multiplication and an addition at the same time. This is accomplished by setting accumulators 4002, 4007 to a third logarithmic value "c", rather than resetting them, prior to starting a new addition or subtraction. Accordingly, when the first number "a" is input it is added to "c" forming the product of A and C. Operations continue as described previously, however, the result will be the logarithm of $AC \pm B$, termed a "multiply-accumulate" or MAC operation. Persons skilled in the art will be able to produce other obvious variations of the above teachings. For example, the apparatus as illustrated in FIG. 10 may be utilized to simultaneously to compute a sum and a difference, known as a "Butterfly operation." A further application would be the use of simultaneous MAC circuits to compute the product of two complex numbers, which variations can be useful in different applications.

The invention of recursively computing Zech logarithms in order to perform logarithmic arithmetic is based on the recursive form of equations (1) and (2) which express the Zech logarithm of a value in terms of the Zech logarithm of a most significant part only plus the Zech logarithm of a greater value. Because the Zech logarithms of greater values are expected to become successively smaller, and thus less significant, a rapidly convergent recursive machine can be constructed for performing logarithmic addition and subtraction.

While the embodiment described with reference to FIGS. 10 and 11 was based on dividing the argument "x" of the Zech logarithm into a most significant and a least significant part, it is to be understood that further divisions of "x" could be provided while still obtaining the benefits of the present invention. For example, "x" could be divided into three parts or more and additional look-up tables could be utilized for the added components. When "x' is divided into more than two parts, it will be found that the computation of x' from x or x" from x' is also a recursive process. These computations may, alternatively, be performed by similar hardware to that illustrated in FIG. 10 but using, for example, stacks in place of accumulators 4002, 4007 as is known to those of ordinary skill in the art in the case of recursive computations. The use of a greater number of divisions of "x" adds increased complexity to the apparatus but allows for a reduction in the size of the look-up tables. This may be advantageous where the precision desired would otherwise result in a table size greater than what can economically be provided by memory chip technology.

The present invention has been described above with respect to FIG. 11 with reference to a flowchart illustrating the operation of the present invention. It will be understood that each block of the flowchart illustration, and combinations of blocks in the flowchart illustration can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

As will also be appreciated by those of skill in the art, the above described aspects of the present invention in FIG. 10 may be provided by hardware, software, or a combination of the above. While the various components of the apparatus of the present invention have been illustrated in part as discrete elements in FIG. 10, they may, in practice, be implemented by a microcontroller (processor) including input and output ports and running software code, by custom or hybrid chips, by discrete components or by a combination of the above.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for summing a plurality of logarithmic numbers, the method comprising the steps of:

expressing each of the plurality of logarithmic numbers as one of a predetermined number of values;

accumulating a number of occurrences of each of the plurality of logarithmic numbers in a plurality of counters, each one of said plurality of counters being associated with one of the predetermined number of values; and reducing a value count of a first one of the plurality of counters having a value count greater than one by decreasing the value count of the first one of the plurality of counters and incrementing a second one of the plurality of counters;

wherein said second one of the plurality of counters has an associated one of the predetermined number of values corresponding to a multiple of the associated one of the predetermined number of values of the first one of the plurality of counters.

2. The method of claim 1 further comprising the step of incrementing a third one of the plurality of counters if the second one of the plurality of counters overflows.

3. The method of claim 2 further comprising the step of repeating said step of reducing a value count until each of the plurality of counters have a value count of one or less.

4. The method of claim 3 wherein said step of reducing a value count is followed by the step of replacing a non-zero count in two of the plurality of counters by incrementing another of the plurality of counters, wherein the non-zero count in two of the plurality of counters is reduced by an aggregate amount corresponding to a single count in the another of the plurality of counters.

5. The method of claim 4 further comprising the step of repeating said step of replacing a non-zero count in two of the plurality of counters by incrementing another of the plurality of counters until only one of the plurality of counters contains a non-zero count corresponding to a sum of the plurality of logarithmic numbers.

6. A method for summing on a computer having memory and a processing means a plurality of quantities, each of which is quantitized to one of a discrete number of values on a non-linear, monotonic scale, the method comprising the steps of:

initializing a plurality of single bit memory elements, each of which correspond to one of the discrete number of values, to zero;

obtaining one of the plurality of quantities;

incrementing a first one of the single bit memory elements corresponding to the quantitized value of the obtained one of the plurality of quantities using modulo-2 arithmetic; and incrementing a second one of the single bit memory elements corresponding to twice the quantitized value of the first one of the single bit memory elements using modulo-2 arithmetic if a carry is generated by said step of incrementing a first one of the single bit memory elements.

7. The method of claim 6 wherein said step of incrementing a second one of the single bit memory elements is followed by the steps of:

propagating any carry from said incrementing a second one of the single bit memory elements step by iteratively incrementing a single bit memory element corresponding to twice the quantitized value of a single bit memory element generating a carry; and repeating said obtaining, incrementing a first one of the single bit memory elements, incrementing a second one of the single bit memory elements and propagating steps for each of the plurality of quantities to be summed to provide a non-zero one of the single bit memory elements corresponding to one of the discrete number of values indicating the sum of the plurality of quantities.

8. The method of claim 7 wherein single bit memory elements having corresponding values related by a factor of two are chained together to form a binary word.

9. A method for combining a first number and a second number, said first and second number each having a sign and logmagnitude, the method comprising the following steps performed on a data processing apparatus having a memory:

comparing the sign of the first number to the sign of the second number to determine if an add or subtract operation is required to combine the first number and the second number;

determining a difference between the logmagnitude of the second number and the logmagnitude of the first number;

identifying a larger magnitude one of the first number or the second number as an output value;

determining if a desired precision threshold has been reached;

identifying a most significant portion and a least significant portion of the determined difference;

obtaining a first value associated with the most significant portion from a first table;

accumulating the obtained first value with the output value;

accumulating the obtained first value with the determined difference to provide a new determined difference; and repeating said determining, identifying a most significant portion, obtaining a first value, accumulating the obtained first value with the output value and accumulating the obtained first value with the determined difference steps until the desired precision threshold is reached.

10. The method of claim 9 wherein the first table contains precomputed Zech logarithms.

11. The method of claim 9 further comprising the steps following said identifying step of:

obtaining a second value associated with the least significant portion from a second table; and wherein said step of accumulating the obtained first value with the determined difference to provide a new determined difference comprises the step of accumulating the obtained first value and the obtained second value with the determined difference to provide a new determined difference.

12. The method of claim 11 wherein the first table and the second table contain precomputed Zech logarithms.

13. An apparatus for summing a plurality of logarithmic numbers, comprising:

means for converting each of the plurality of logarithmic numbers to one of a predetermined number of values;

means for accumulating a number of occurrences of each of the plurality of logarithmic numbers in a plurality of counters, each one of said plurality of counters being associated with one of the predetermined number of values; and means for reducing a value count of a first one of the plurality of counters having a value count greater than one by decreasing the value count of a first one of the plurality of counters and incrementing a second one of the plurality of counters, wherein the second one of the plurality of counters has an associated one of the predetermined number of values corresponding to a multiple of the associated one of the predetermined number of values of the first one of the plurality of counters.

14. The apparatus of claim 13 further comprising means for incrementing a third one of the plurality of counters when the second one of the plurality of counters overflows.

15. The apparatus of claim 14 further comprising control means for reducing a value count of each of the plurality of counters to a value count of one or less.

16. The method of claim 15 further comprising means for replacing a non-zero count in two of the plurality of counters by incrementing another of the plurality of counters, wherein the non-zero count in two of the plurality of counters is reduced by an aggregate amount corresponding to a single count in the another of the plurality of counters.

17. The method of claim 16 further comprising means for iteratively replacing a non-zero count in two of the plurality of counters by incrementing another of the plurality of counters until only one of the plurality of counters contains a non-zero count corresponding to a sum of the plurality of logarithmic numbers.

18. An apparatus for providing a summation of a plurality of quantities, each of which is quantitized to one of a discrete number of values on a non-linear, monotonic scale, comprising:

a processor;

a plurality of single bit memory elements, each of which correspond to one of the discrete number of values, operatively associated with the processor;

means operatively associated with the plurality of single bit memory elements for initializing the plurality of single bit memory to zero;

means electrically connected to the processor for inputting one of the plurality of quantities;

the processor including:
  means for incrementing a first one of the plurality of single bit memory elements corresponding to a quantitized value of an input one of the plurality of quantities using modulo-2 arithmetic; and
  means for incrementing a second one of the plurality of single bit memory elements corresponding to twice the quantitized value of the input one of the plurality of quantities using modulo-2 arithmetic if a carry is generated by said means for incrementing a first one of the plurality of single bit memory elements.

19. The apparatus of claim 18 wherein the processor further comprises:
  means for propagating a carry from said means for incrementing a second one of the plurality of single bit memory elements by iteratively incrementing a single bit memory element corresponding to twice the quantitized value of a single bit memory element generating a carry; and
  means for sequentially initiating operations by the inputting means, the means for incrementing a first one of the single bit memory elements, the means for incrementing a second one of the single bit memory elements and the means for propagating for each of the plurality of quantities to be summed to provide a non-zero one of the plurality of single bit memory elements corresponding to one of the discrete number of values indicating the summation of the plurality of quantities.

20. The apparatus of claim 19 wherein ones of the plurality of single bit memory elements having corresponding values related by a factor of two are chained together to form a binary word.

21. An apparatus for combining a first number and a second number, comprising:
  an input bus for inputting a logmagnitude and a sign of the first number and a logmagnitude and a sign of the second number;
  an input accumulator operatively associated with the input bus;
  first storage means operatively associated with the input accumulator for storing a first set of values;
  second storage means operatively associated with the input accumulator for storing a second set of values;
  an output register operatively associated with the first storage means; and
  a processor, operatively associated with the input accumulator, the processor comprising:
    means for comparing the sign of the first number to the sign of the second number to determine if an add or subtract operation is required to combine the first number and the second number;
    means for determining a difference between the logmagnitude of the first number and the logmagnitude of the second number and for storing the larger logmagnitude in the output register as an output value;
    means for determining if a desired precision threshold has been reached;
    means for obtaining a first value associated with a most significant portion of the difference between the logmagnitude of the first number and the logmagnitude of the second number;
    means for initiating accumulating the obtained first value with the output value; and
    means for initiating accumulating the obtained first value with the difference between the logmagnitude of the first number and the logmagnitude of the second number to provide a new determined difference.

22. The apparatus of claim 21 wherein the first storage means contains precomputed Zech logarithm values.

23. The apparatus of claim 21 wherein the processor further comprises:
  means for obtaining a second value associated with a least significant portion of the difference between the logmagnitude of the first number and the logmagnitude of the second number; and
  wherein said means for initiating accumulating the obtained first value with the difference between the logmagnitude of the first number and the logmagnitude of the second number to provide a new determined difference comprises means for initiating accumulating the obtained first value and the obtained second value with the difference between the logmagnitude of the first number and the logmagnitude of the second number to provide a new determined difference.

24. The apparatus of claim 23 wherein the first storage means and the second storage means contain precomputed Zech logarithm values.

25. The computer program product of claim 24 further comprising computer-readable program code means for incrementing a third one of the plurality of counters when the second one of the plurality of counters overflows.

26. The computer program product of claim 25 further comprising computer-readable program code means for replacing a non-zero count in two of the plurality of counters by incrementing another of the plurality of counters, wherein the non-zero count in two of the plurality of counters is reduced by an aggregate amount corresponding to a single count in the another of the plurality of counters.

27. A computer program product for summing a plurality of logarithmic numbers, the computer program product comprising:
  a computer-readable storage medium having computer-readable program code means embodied in said medium, said computer-readable program code means comprising:
    computer-readable program means for converting each of the plurality of logarithmic numbers to one of a predetermined number of values;
    computer-readable program code means for accumulating a number of occurrences of each of the plurality of logarithmic numbers in a plurality of counters, each one of said plurality of counters being associated with one of the predetermined number of values; and
    computer-readable program code means for reducing a value count of a first one of the plurality of counters having a value count greater than one by decreasing the value count of a first one of the plurality of counters and incrementing a second one of the plurality of counters, wherein the second one of the plurality of counters has an associated one of the predetermined number of values corresponding to a multiple of the associated one of the predetermined number of values of the first one of the plurality of counters.

28. The computer program product of claim 27 further comprising computer-readable program code means for reducing a value count of each of the plurality of counters to a value count of one or less.

29. The computer program product of claim 28 further comprising computer-readable program code means for iteratively replacing a non-zero count in two of the plurality of counters by incrementing another of the plurality of counters until only one of the plurality of counters contains a non-zero count corresponding to a sum of the plurality of logarithmic numbers.

30. A computer program product for combining a first number and a second number, said first and second number each having a sign and logmagnitude, the computer program product comprising:

a computer-readable storage medium having computer-readable program code means embodied in said medium, said computer-readable program code means comprising:

computer-readable program means for comparing the sign of the first number to the sign of the second number to determine if an add or subtract operation is required to combine the first number and the second number;

computer-readable program means for determining a difference between the logmagnitude of the second number and the logmagnitude of the first number;

computer-readable program means for identifying a larger magnitude one of the first number or the second number as an output value;

computer-readable program means for determining if a desired precision threshold has been reached;

computer-readable program means for identifying a most significant portion and a least significant portion of the determined difference;

computer-readable program means for obtaining a first value associated with the most significant portion from a first table;

computer-readable program means for accumulating the obtained first value with the output value;

computer-readable program means for accumulating the obtained first value with the determined difference to provide a new determined difference; and computer-readable program means for determining if a desired precision threshold has been reached.

* * * * *